United States Patent
Keehnel et al.

(10) Patent No.: US 11,733,021 B2
(45) Date of Patent: Aug. 22, 2023

(54) MODULAR CONFIGURATION FOR COORDINATE MEASURING MACHINE PROBE

(71) Applicant: Mitutoyo Corporation, Kanagawa-ken (JP)

(72) Inventors: Dawn Alisa Keehnel, Bothell, WA (US); Christopher Richard Hamner, Kirkland, WA (US); Scott Ellis Hemmings, Edmonds, WA (US); Scott Allen Harsila, Shoreline, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 63 days.

(21) Appl. No.: 17/559,554

(22) Filed: Dec. 22, 2021

(65) Prior Publication Data

US 2023/0194235 A1 Jun. 22, 2023

(51) Int. Cl.
*G01B 7/016* (2006.01)
*G01B 11/00* (2006.01)
*G01B 5/016* (2006.01)

(52) U.S. Cl.
CPC .............. *G01B 7/016* (2013.01); *G01B 5/016* (2013.01); *G01B 11/007* (2013.01)

(58) Field of Classification Search
CPC ....... G01B 7/016; G01B 5/016; G01B 11/007
See application file for complete search history.

(56) References Cited

U.S. PATENT DOCUMENTS

| | | | |
|---|---|---|---|
| 4,451,987 | A | 6/1984 | Cusack |
| 4,651,405 | A | 3/1987 | McMurtry |
| 4,810,966 | A | 3/1989 | Schmall |
| 4,866,854 | A | 9/1989 | Seltzer |
| 5,109,223 | A | 4/1992 | Schmitt et al. |
| 5,209,131 | A | 5/1993 | Baxter |
| 5,326,982 | A | 7/1994 | Wiklund |
| 5,345,689 | A | 9/1994 | McMurtry et al. |

(Continued)

FOREIGN PATENT DOCUMENTS

| | | |
|---|---|---|
| CN | 103229024 A | 7/2013 |
| CN | 108291801 A | 7/2018 |

(Continued)

OTHER PUBLICATIONS

Extended European Search Report, dated May 10, 2023, for European Patent Application No. 22213147.6. (11 pages).

(Continued)

*Primary Examiner* — Yaritza Guadalupe-McCall
(74) *Attorney, Agent, or Firm* — Seed IP Law Group LLP

(57) ABSTRACT

A modular configuration for a scanning probe for a coordinate measuring machine include a stylus suspension module, a stylus position detection module, and a signal processing and control circuitry module. The stylus position detection module is configured to be assembled separately from the stylus suspension module before mounting to the stylus suspension module. The signal processing and control circuitry module is configured to be assembled separately from the stylus position detection module and the stylus suspension module before rigidly coupling to the stylus position detection module as part of assembling the scanning probe.

20 Claims, 18 Drawing Sheets

(56) References Cited

U.S. PATENT DOCUMENTS

| | | | |
|---|---|---|---|
| 5,756,997 A * | 5/1998 | Kley | B82Y 35/00 |
| | | | 977/869 |
| 5,841,274 A | 11/1998 | Masreliez et al. | |
| 6,043,644 A | 3/2000 | de Coulon et al. | |
| 6,526,672 B1 | 3/2003 | Danielli et al. | |
| 6,971,183 B2 | 12/2005 | Brenner et al. | |
| 7,652,275 B2 | 1/2010 | Gladnick | |
| 8,312,635 B2 * | 11/2012 | Jordil | G01B 5/012 |
| | | | 33/503 |
| 8,438,746 B2 | 5/2013 | Usui | |
| 8,479,403 B2 * | 7/2013 | Jordil | G01B 5/012 |
| | | | 33/503 |
| 9,605,943 B2 | 3/2017 | Shimaoka et al. | |
| 9,791,262 B2 | 10/2017 | Harsila et al. | |
| 9,803,972 B2 | 10/2017 | Sesko | |
| 9,810,529 B2 | 11/2017 | Shimaoka et al. | |
| 9,835,433 B1 | 12/2017 | Antreasyan et al. | |
| 10,006,757 B1 | 6/2018 | Sesko | |
| 10,145,666 B2 | 12/2018 | Jansson | |
| 10,184,773 B2 | 1/2019 | Jansson | |
| 10,215,547 B2 | 2/2019 | Hemmings et al. | |
| 10,323,928 B2 | 6/2019 | Sesko | |
| 10,852,119 B2 | 12/2020 | Harsila et al. | |
| 10,866,080 B2 * | 12/2020 | Cook | G01B 5/016 |
| 10,876,829 B2 | 12/2020 | Qi et al. | |
| 10,914,570 B2 * | 2/2021 | Hamner | G01B 5/016 |
| 10,914,581 B2 | 2/2021 | Atherton | |
| 11,474,127 B2 * | 10/2022 | Coe | G01Q 30/10 |
| 11,543,899 B2 | 1/2023 | Hamner | |
| 2003/0048592 A1 | 3/2003 | Thomas et al. | |
| 2005/0253576 A1 | 11/2005 | Nyce | |
| 2011/0258868 A1 * | 10/2011 | Jordil | G01B 5/012 |
| | | | 33/503 |
| 2013/0111774 A1 | 5/2013 | McMurtry et al. | |
| 2015/0330766 A1 | 11/2015 | Gong | |
| 2016/0195389 A1 | 7/2016 | Sagemueller et al. | |
| 2017/0176171 A1 | 6/2017 | Harsila et al. | |
| 2017/0248402 A1 | 8/2017 | Koga et al. | |
| 2017/0370688 A1 | 12/2017 | Hemmings et al. | |
| 2018/0156594 A1 | 6/2018 | Jansson | |
| 2018/0364026 A1 | 12/2018 | Sesko | |
| 2019/0004092 A1 | 1/2019 | Hemmings | |
| 2019/0120606 A1 | 4/2019 | Harsila et al. | |
| 2020/0141714 A1 * | 5/2020 | Cook | G01B 5/016 |
| 2020/0141717 A1 * | 5/2020 | Hamner | G01B 1/00 |
| 2021/0116228 A1 * | 4/2021 | Hamner | G01B 5/012 |
| 2021/0117020 A1 * | 4/2021 | Hamner | G06F 3/04162 |
| 2021/0349127 A1 * | 11/2021 | Coe | G01Q 30/20 |
| 2022/0074728 A1 * | 3/2022 | Hamner | G01D 5/2053 |
| 2022/0205773 A1 * | 6/2022 | Hamner | G01D 5/2053 |

FOREIGN PATENT DOCUMENTS

| | | |
|---|---|---|
| DE | 23 47 899 A1 | 4/1975 |
| DE | 199 28 151 B4 | 1/2006 |
| EP | 0 130 940 A1 | 1/1985 |
| EP | 4019886 A1 | 6/2022 |
| EP | 4019888 A1 | 6/2022 |
| JP | 2012211879 A | 11/2012 |
| WO | 2018/006032 A1 | 1/2018 |
| WO | 2019/067755 A1 | 4/2019 |

OTHER PUBLICATIONS

Extended European Search Report, dated May 10, 2023, for European Patent Application No. 22213152.6. (14 pages).

* cited by examiner

1202 — Mount a stylus position detection module to a stylus suspension module (e.g., utilizing a module mounting configuration), wherein the stylus suspension module comprises a stylus coupling portion that is configured to be rigidly coupled to a stylus with a probe tip, and a stylus motion mechanism that enables axial motion of the stylus coupling portion along an axial direction and rotary motion of the stylus coupling portion about a rotation center, and the stylus position detection module is assembled separately from the stylus suspension module before mounting to the stylus suspension module, and when mounted the stylus position detection module is arranged along a central axis that is parallel to the axial direction and nominally aligned with the rotation center, and the stylus position detection module comprises a sensor configuration comprising: a field generating coil configuration comprising at least one field generating coil; a top axial sensing coil configuration comprising at least one top axial sensing coil; a bottom axial sensing coil configuration comprising at least one bottom axial sensing coil; and a plurality of top rotary sensing coils and a plurality of bottom rotary sensing coils 1204 — Rigidly couple a signal processing and control circuitry module to the stylus position detection module (e.g., utilizing a module coupling configuration), wherein the signal processing and control circuitry module is assembled separately from the stylus position detection module and the stylus suspension module before rigidly coupling to the stylus position detection module, wherein the signal processing and control circuitry module is operably connected to the coils of the stylus position detection module to provide a coil drive signal to the at least one field generating coil and to input signals comprising respective signal components provided by respective rotary and axial sensing coils of the stylus position detection module, and to output signals indicative of an axial position and a rotary position of the probe tip

*FIG.12*

MODULAR CONFIGURATION FOR COORDINATE MEASURING MACHINE PROBE

BACKGROUND

Technical Field

This disclosure relates to precision metrology, and more particularly to coordinate measuring machine probes.

Description of the Related Art

Coordinate measurement machines (CMM's) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183, which is hereby incorporated herein by reference in its entirety. The probe disclosed therein includes a stylus having a probe tip (i.e., a surface contact portion), an axial motion mechanism, and a rotary motion mechanism. The axial motion mechanism includes a moving member that allows the probe tip to move in a central axis direction (also referred to as a Z direction or an axial direction) of the measuring probe. The rotary motion mechanism includes a rotating member that allows the probe tip to move perpendicular to the Z direction. The axial motion mechanism is nested inside the rotary motion mechanism. The probe tip location and/or workpiece surface coordinates are determined based on the displacement of the rotating member and the axial displacement of the axial motion moving member.

Inductive position detectors for stylus position measurements in CMM scanning probes are disclosed in U.S. Patent Publication Nos. 2020/0141714 and 2020/0141717, each of which is hereby incorporated herein by reference in its entirety. The disclosed configurations include rotary sensing coils and respective axial sensing coil configurations. A stylus-coupled conductive disruptor moves along Z (axial) and X-Y (rotary) directions in a motion volume. A generating coil generates a changing magnetic flux encompassing the disruptor and coils, and coil signals indicate the disruptor and/or stylus position.

Configurations that may improve or otherwise enhance such CMM scanning probes (e.g., in relation to ease of assembly and/or improved operating characteristics, etc.) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

According to one aspect, a modular configuration for a scanning probe for a coordinate measuring machine is provided. The modular configuration for the scanning probe includes a stylus suspension module, comprising: a stylus coupling portion that is configured to be rigidly coupled to a stylus with a probe tip; and a stylus motion mechanism that enables axial motion of the stylus coupling portion along an axial direction, and rotary motion of the stylus coupling portion about a rotation center.

The modular configuration for the scanning probe further includes a stylus position detection module configured to be assembled separately from the stylus suspension module before mounting to the stylus suspension module as part of assembling the scanning probe. When mounted the stylus position detection module is configured to be arranged along a central axis that is parallel to the axial direction and nominally aligned with the rotation center. The stylus position detection module includes a sensor configuration comprising: a field generating coil configuration comprising at least one field generating coil; a top axial sensing coil configuration comprising at least one top axial sensing coil; a bottom axial sensing coil configuration comprising at least one bottom axial sensing coil; and a plurality of top rotary sensing coils and a plurality of bottom rotary sensing coils.

A disruptor configuration of the scanning probe is configured to be coupled to the stylus suspension module. The disruptor configuration comprises a conductive disruptor element that provides a disruptor area, wherein the disruptor element is configured to be located along the central axis in a disruptor motion volume and to be coupled to the stylus suspension module by a disruptor coupling configuration, and to move in the disruptor motion volume relative to an undeflected position in response to a deflection of the stylus suspension module, for which the disruptor element moves over operating motion ranges+/−Rz along the axial direction in response to the axial motion, and over respective operating motion ranges+/−Rx and +/−Ry along orthogonal X and Y directions that are orthogonal to the axial direction in response to the rotary motion. The field generating coil configuration is configured to generate a changing magnetic flux generally along the axial direction in the disruptor motion volume in response to a coil drive signal.

The modular configuration for the scanning probe further includes a signal processing and control circuitry module that is configured to be assembled separately from the stylus position detection module and the stylus suspension module before rigidly coupling to the stylus position detection module as part of assembling the scanning probe. The signal processing and control circuitry module is configured to be operably connected to the coils (e.g., of the field generating coil configuration, axial sensing coil configurations, and rotary sensing coils) of the stylus position detection module to provide the coil drive signal and to input signals comprising respective signal components provided by the respective rotary and axial sensing coils, and to output signals indicative of an axial position and a rotary position of one or more of the disruptor element, the stylus coupling portion, or the probe tip (e.g., in various implementations, the signals that are output may be indicative of an axial position and a rotary position of each of the disruptor element, the stylus coupling portion, and the probe tip).

According to another aspect, a scanning probe for a coordinate measuring machine is provided. The scanning probe comprises a stylus suspension module, comprising: a stylus coupling portion that is configured to be rigidly coupled to a stylus with a probe tip; and a stylus motion mechanism that enables axial motion of the stylus coupling portion along an axial direction, and rotary motion of the stylus coupling portion about a rotation center.

The scanning probe further comprises a stylus position detection module configured to be arranged along a central axis that is parallel to the axial direction and nominally aligned with the rotation center. The stylus position detection module comprising:

a sensor configuration, comprising:
  a field generating coil configuration comprising at least one field generating coil;
  a top axial sensing coil configuration comprising at least one top axial sensing coil;
  a bottom axial sensing coil configuration comprising at least one bottom axial sensing coil; and
  a plurality of top rotary sensing coils and a plurality of bottom rotary sensing coils; and
a shield configuration that is located around the sensor configuration and comprises electrically conductive material for shielding the sensor configuration.

The scanning probe further comprises a disruptor configuration comprising a conductive disruptor element that provides a disruptor area. The disruptor element is located along the central axis in a disruptor motion volume and the disruptor element is coupled to the stylus suspension module by a disruptor coupling configuration. The disruptor element moves in the disruptor motion volume relative to an undeflected position in response to a deflection of the stylus suspension module, the disruptor element moving over operating motion ranges+/−Rz along the axial direction in response to the axial motion, and over respective operating motion ranges+/−Rx and +/−Ry along orthogonal X and Y directions that are orthogonal to the axial direction in response to the rotary motion. The field generating coil configuration generates a changing magnetic flux generally along the axial direction in the disruptor motion volume in response to a coil drive signal.

The scanning probe further comprises a signal processing and control circuitry module configured to be operably connected to the coils of the stylus position detection module to provide the coil drive signal and to input signals comprising respective signal components provided by the respective rotary and axial sensing coils, and to output signals indicative of an axial position and a rotary position of one or more of the disruptor element, the stylus coupling portion, or the probe tip.

BRIEF DESCRIPTION OF THE SEVERAL VIEWS OF THE DRAWINGS

FIG. 12 is a flow diagram showing one example of a method for assembling a modular configuration of a scanning probe according to principles disclosed herein.

DETAILED DESCRIPTION

Figure 1:
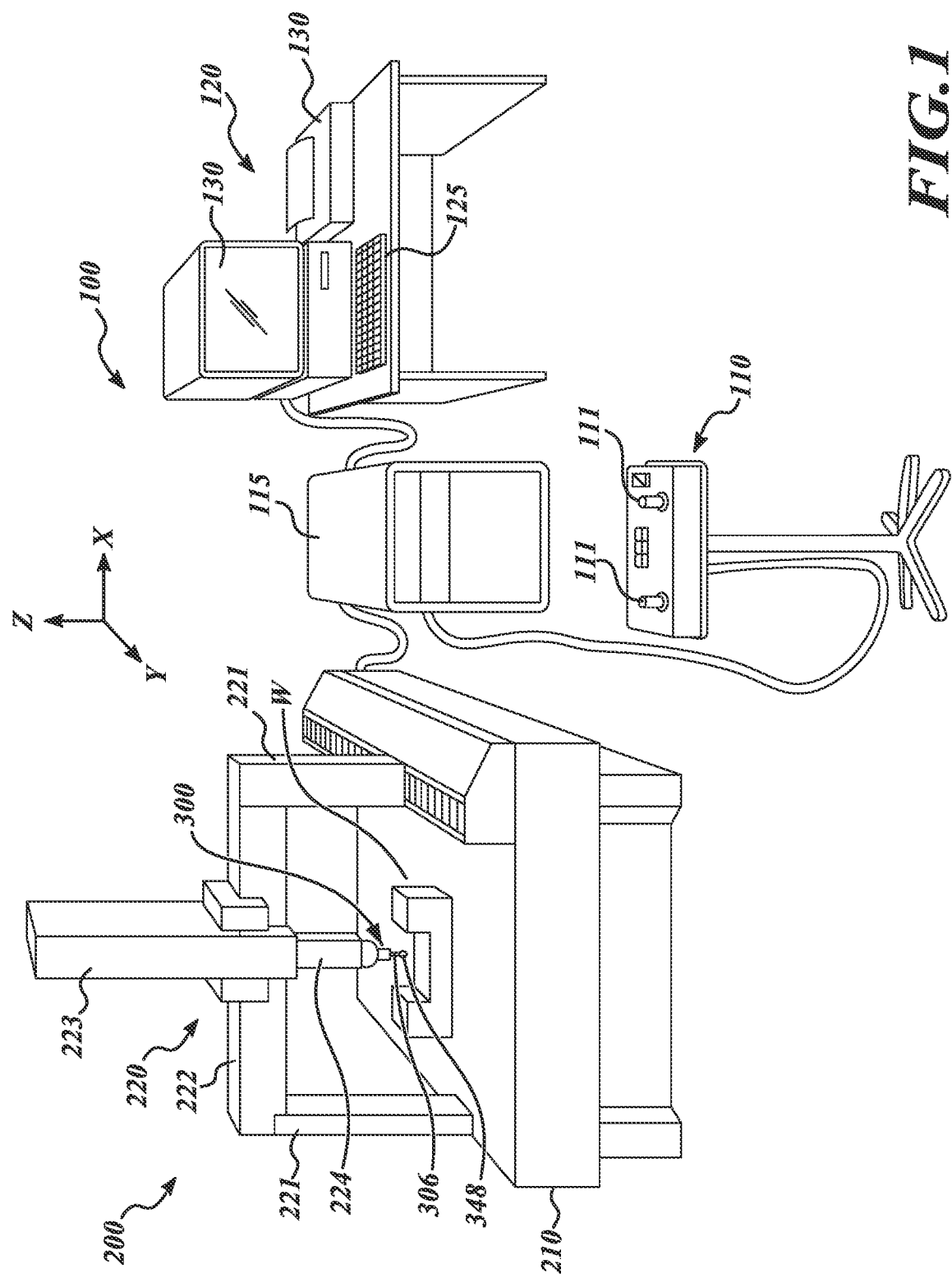
FIG. 1 is a diagram showing various typical components of a measuring system including a CMM utilizing a scanning probe such as that disclosed herein.

FIG. 1 is a diagram showing various typical components of a measuring system 100 including a CMM 200 utilizing a scanning probe 300 such as that disclosed herein. The measuring system 100 includes an operating unit 110, a motion controller 115 that controls movements of the CMM 200, a host computer 120, and the CMM 200. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and a drive mechanism attachment portion 224 for attaching the scanning probe 300 to the drive mechanism 220. The drive mechanism 220 includes X axis, Y axis, and Z axis movement mechanisms 222, 221, and 223 (e.g., slide mechanisms), respectively, for moving the scanning probe 300 three-dimensionally. A stylus 306 attached to the end of the scanning probe 300 includes a probe tip 348 (e.g., which may also or alternatively be referenced as a contact portion 348). As will be described in more detail below, the stylus 306 is attached to a stylus suspension module of the scanning probe 300, which allows the probe tip 348 to freely change its position in three directions when the probe tip 348 moves along a measurement path on the surface of the workpiece W.

Figure 2:
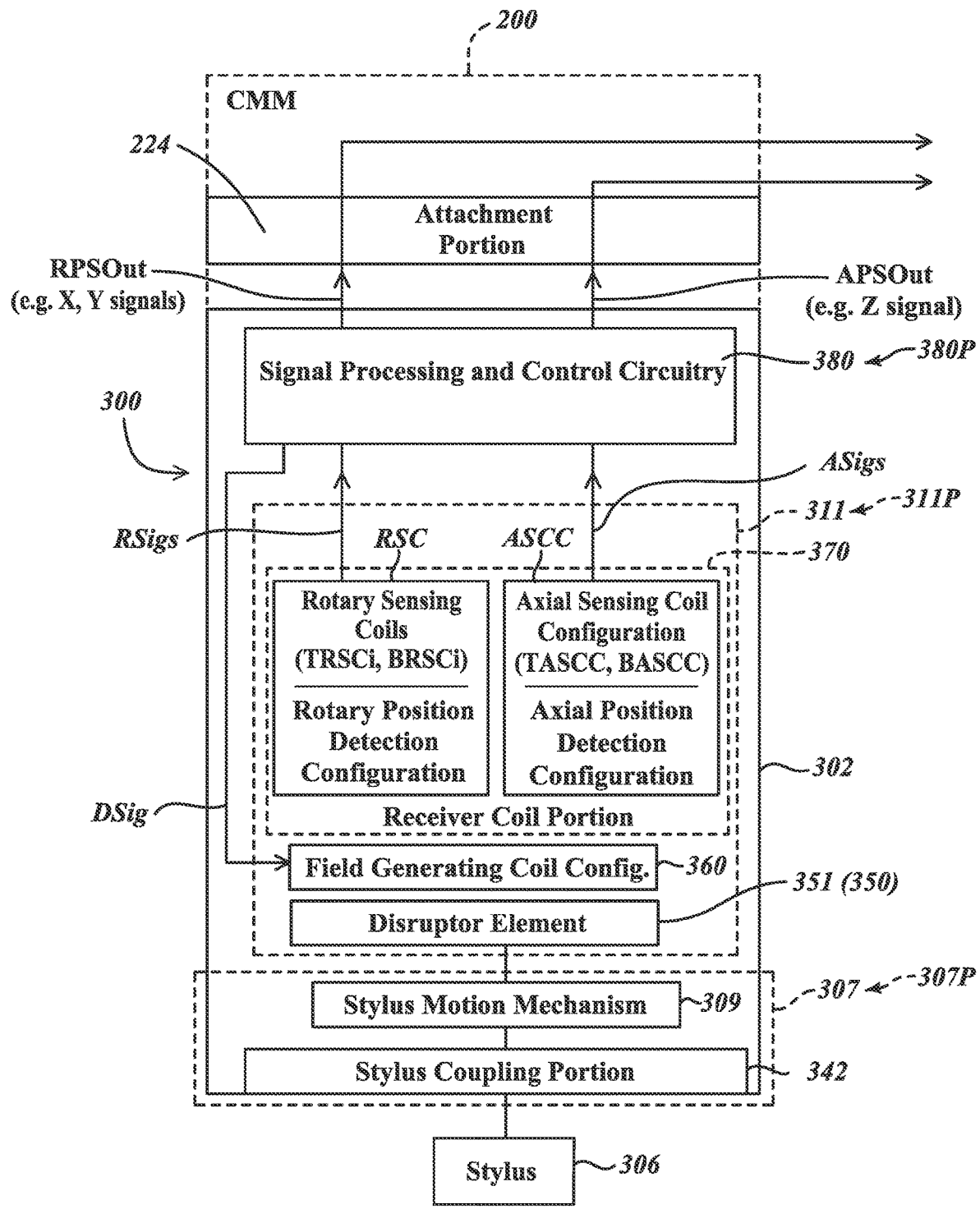
FIG. 2 is a block diagram showing various elements of a scanning probe as coupled to a CMM and providing rotary and axial position signals.

FIG. 2 is a block diagram showing various elements of a scanning probe 300 as coupled to a CMM 200 and providing rotary (e.g., X, Y) and axial (e.g., Z) position signals. In various implementations, the scanning probe 300 may include a stylus suspension portion 307P, a stylus position detection portion 311P and a signal processing and control circuitry portion 380P. Each portion may include a corresponding module, such as a stylus suspension module 307, a stylus position detection module 311, and a signal processing and control circuitry module 380, each of which will be described in more detail below. In various implementations, a probe main body 302 may include each of the modules of the scanning probe 300.

The stylus suspension module 307 includes a stylus coupling portion 342 and a stylus motion mechanism 309. The stylus coupling portion 342 is rigidly coupled to a stylus 306. The stylus motion mechanism 309 is configured to enable axial motion of the stylus coupling portion 342 and attached stylus 306 along an axial direction, and to enable rotary motion of the stylus coupling portion 342 and attached stylus 306 about a rotation center, as will be described in more detail below with respect to FIGS. 3 and 4A. The signal processing and control circuitry module 380 included in the scanning probe 300 is connected to and governs the operation of the stylus position detection module 311, and may perform related signal processing, all as described in greater detail below.

As shown in FIG. 2, the stylus position detection module 311 uses inductive sensing principles and includes a receiver coil portion 370 and a field generating coil configuration 360. The stylus position detection module 311 senses a position of a disruptor element 351 (which may be part of a disruptor configuration 350, which may include a plurality of parts in some implementations). In various implementations, the disruptor configuration 350 with the disruptor element 351 may be part of the stylus position detection portion 311P (e.g., either as included or not included in the stylus position detection module 311), or may be a separate configuration and/or element.

The receiver coil portion 370 may comprise a rotary sensing coil portion (also referred to as rotary sensing coils) RSC and an axial sensing coil configuration ASCC. Briefly, the moving disruptor element 351 (or more generally, the disruptor configuration 350) causes position-dependent variations in a changing magnetic field generated by the field generating coil configuration 360. The receiver coil portion 370 is responsive to the changing magnetic field and the variations therein caused by the disruptor element 351. In particular, the rotary sensing coil portion RSC outputs at least first and second rotary signal components RSigs that are indicative of the rotary position (e.g., X and Y position signals) of the stylus coupling portion 342 over corresponding signal lines, and the axial sensing coil configuration ASCC outputs one or more axial signal components ASigs that is indicative of the axial position (e.g., a Z position signal) of the stylus coupling portion 342 over corresponding signal lines, as described in greater detail below with reference to FIGS. 3, 5 and 6, for example. In various implementations, the signal processing and control circuitry module 380 receives the rotary signal components RSigs and the axial signal components ASigs, and may perform various levels of related signal processing in various implementations. For example, in one implementation, the signal processing and control circuitry module 380 may cause the signal components from various receiver coils to be combined and/or processed in various relationships, and provide the results in a desired output format as the rotary and axial position signal outputs RPSOut and APSOut, through the attachment portion 224. One or more receiving portions (e.g., in the CMM 200, motion controller 115, host computer 120, etc.) may receive the rotary and axial position signal outputs RPSOut and APSOut, and one or more associated processing and control portions may be utilized to determine a three-dimensional position of the stylus coupling portion 342 and/or of the probe tip of the attached stylus 306 as its probe tip 348 moves along a surface of a workpiece W that is being measured.

Figure 3:
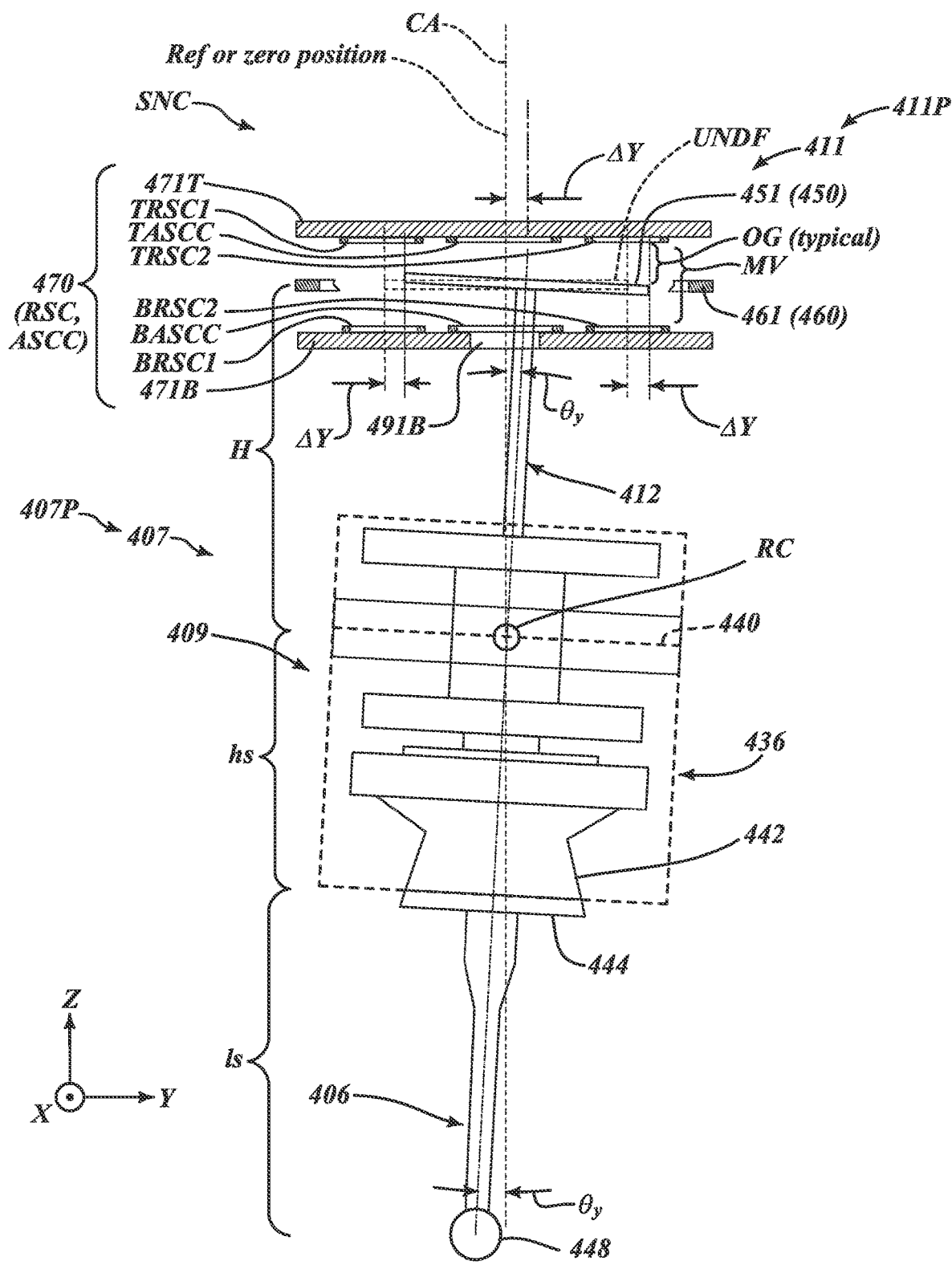
FIG. 3 is a diagram showing portions of a first exemplary implementation of a stylus suspension module as coupled to a stylus and a first exemplary implementation of a stylus position detection module for detecting the position of the stylus suspension module.

FIG. 3 is partially schematic diagram showing portions of a first exemplary implementation of a schematically represented stylus suspension module 407 of a stylus suspension portion 407P as coupled to a stylus 406, along with a partially schematic cross-section of portions of a first exemplary implementation of a stylus position detection module 411 of a stylus position detection portion 411P for detecting the position of at least part of the stylus suspension module 407 (e.g., a stylus coupling portion 442) and/or the stylus 406. It will be appreciated that certain numbered components 4XX of FIG. 3 may correspond to and/or have similar operations as similarly numbered counterpart components 3XX of FIG. 2, and may be understood by analogy thereto and as otherwise described below. This numbering scheme to indicate elements having analogous design and/or function is also applied to the following FIGS. 4A-11. As shown in FIG. 3, the stylus suspension module 407 includes a stylus motion mechanism 409 and a stylus coupling portion 442. The stylus coupling portion 442 is configured to be rigidly coupled to a stylus 406 which has a probe tip 448 for contacting a surface of a workpiece W (e.g., see FIG. 1).

As will be described in more detail below with respect to FIG. 4A, the stylus motion mechanism 409 may be attached to a frame (e.g., of the scanning probe), and is configured to enable axial and rotary motion of the stylus coupling portion 442 and attached stylus 406 so that the probe tip 448 can change its position in three directions along the shape of the surface of the workpiece W. For purposes of illustration, the vertical and horizontal directions on the plane of paper in FIG. 3 are defined as Z and Y directions, respectively, and the perpendicular direction to the plane of the paper is defined as the X direction. The direction of a central axis CA, also referred to as the axial direction, of the measuring probe 300 coincides with the Z direction in this illustration.

In FIG. 3, rotary motion portions of the stylus motion mechanism 409 are represented, including a rotating member 436, a flexure element 440, and a moving member 412 disposed within the rotating member 436. As will be described in more detail below with respect to FIG. 4A, the flexure element 440 enables rotary motion of the rotating member 436 about a rotation center RC. As will be described in more detail below, in various implementations rotary sensing coils TRSCi and BRSCi (where i is an index integer which identifies specific coils) of stylus position detection module 411 are able to sense the rotated position of the disruptor element 451 and thereby the rotated position of the moving member 412 (e.g., in X and Y directions), and the axial sensing coil configurations TASCC and BASCC (also referred to as the axial sensing coils) are able to sense the axial position of the disruptor element 451 and thereby the axial position of the moving member 412 (e.g., in the Z direction).

As shown in FIG. 3, a disruptor element 451 (or more generally a disruptor configuration 450) is coupled to the moving member 412 and moves relative to the scanning probe frame (e.g., wherein the frame is included as part of the scanning probe main body, etc.), within a disruptor motion volume MV located between the top and bottom coil substrates 471T and 471B, respectively. As shown in FIG. 3, the moving member 412 extends through and moves in a hole 491B located along the central axis CA in a bottom coil substrate 471B. The attached disruptor element 451 moves in the disruptor motion volume MV relative to an undeflected position UNDF (e.g., which may also correspond to a zero or reference position) in response to a deflection of the stylus suspension module 407 and the moving member 412. In various implementations, the disruptor configuration 450 with the disruptor element 451 may be part of the stylus position detection portion 411P (e.g., either as included or not included in the stylus position detection module 411), or may be a separate configuration and/or element.

In the implementation shown in FIG. 3, the field generating coil configuration 460 comprises a single planar field generating coil 461 that is located approximately at a midplane of the disruptor motion volume MV and that is nominally planar and orthogonal to the central axis CA. As previously outlined with reference to FIG. 2, the receiver coil portion 470 may generally comprise a rotary sensing coil portion (also referred to as rotary sensing coils) RSC and an axial sensing coil configuration ASCC. The rotary position detection configuration RSC generally includes top rotary sensing coils TRSCi and bottom rotary sensing coils BRSCi.

In the example of FIG. 3, the planar top coil substrate 471T includes N top rotary sensing coils TRSC (e.g., TRSC1-TRSC4, where N=4, in evenly spaced positions around the central axis CA) and a top axial sensing coil configuration TASCC (e.g., comprising a single individual coil in this implementation), and the planar bottom coil substrate 471B includes N bottom rotary sensing coils BRSC (e.g., BRSC1-BRSC4, where N=4, in evenly spaced positions around the central axis CA) and a bottom axial sensing coil configuration BASCC (e.g., comprising the single individual coil in this implementation). The top and bottom coil substrates 471T and 471B may be nominally parallel to one another and nominally orthogonal to the central axis CA, and are spaced apart along the central axis CA with a disruptor motion volume located therebetween. It should be appreciated that although the various sensing coils shown in FIGS. 3 and 4 may in some instances be represented by "closed loops" for simplicity of illustration, all coils comprise windings or conductors that have first and second connection ends that are configured to operate as one or more inductively coupled "turns" and be coupled to associated circuitry (e.g., the circuitry of the signal processing and control circuitry module 480).

In the cross section shown in FIG. 3, only two top rotary sensing coils TRSC1 and TRSC2, and two bottom rotary sensing coils BRSC1 and BRSC2, are visible. These rotary sensing coils may provide signal components indicative of the position of the disruptor element 451 along the Y direction. In particular, their signal components vary depending on an amount of displacement ΔY of the disruptor element 451 along the Y direction, and are therefore indicative of the amount of displacement ΔY. The displacement ΔY determines an associated amount of "overlap" between the disruptor element 451 and the various rotary sensing coils TRSCi and BRSCi, and thereby their amount of coupling to the changing magnetic field generated by the field generating coil 461 (which determines the resultant signal components). Other rotary sensing coils (e.g., top rotary sensing coils TRSC3 and TRSC4, and bottom rotary sensing coils BRSC3 and BRSC4) provide signal components which are similarly indicative of the position of the disruptor element 451 along the X axis direction. The rotary sensing coils TRSC3, TRSC4, BRSC3 and BRSC4 would be visible in a view rotated by 90 degrees around the central axis CA relative to the view of FIG. 3 (e.g., and in the rotated view would be in similar locations as those currently shown in FIG. 3 for the rotary sensing coils TRSC1, TRSC2, BRSC1 and BRSC2, respectively).

The axial sensing coil configuration ASCC includes the top axial sensing coil configuration TASCC and the bottom axial sensing coil configuration BASCC. In the implementation shown in FIG. 3, the top axial sensing coil configuration TASCC comprises a single top axial sensing coil that at least partially surrounds the central axis CA, and the bottom axial sensing coil configuration BASCC comprises a single bottom axial sensing coil that at least partially surrounds the central axis CA, as shown. These axial sensing coils are always completely "overlapped" by the disruptor element 451, in this particular example embodiment. Therefore, their signal components are nominally only responsive to the position of the disruptor element 451 along the axial or Z direction, and are indicative of the position of the disruptor element 451 along the Z direction.

Similar to operations previously outlined with reference to FIG. 2, in operation the moving disruptor element 451 causes position-dependent local variations in a changing magnetic field along the axial direction generated by the field generating coil 461. The receiver coil portion 470 is responsive to the changing magnetic field and the variations therein caused by the disruptor element 451, and outputs the rotary signal components RSigs and the axial signal components ASigs that may be processed to determine the rotary position of the disruptor element 451 (e.g., a Y and X position, and corresponding signals) and its axial position (e.g., a Z position), as previously outlined with reference to FIG. 2, and as described in detail further below. It will be appreciated that the position of the disruptor element 451 is related by a known geometry to the position of the stylus coupling portion 442 and/or its probe tip 448, such that signals/positions that are indicative of one of the positions are also indicative of the other positions. For example, for small rotation angles, for the illustrated movement or displacement ΔY of the disruptor element 451 along the Y direction away from null (e.g., from the undeflected position UNDF):

$$\Delta Y = H\theta_Y \quad \text{(Eq. 1)}$$

where H is the distance from the rotation center RC to the nominal plane of the disruptor element 451, and $\theta_Y$ is the rotary motion tilt of the rotating member 436 (and the moving member 412) in a plane parallel to the Y direction (i.e., that is, rotation about an axis parallel to the X axis at the rotation center RC). If a larger rotation angle is used in various implementations, an analogous expression that is accurate for larger rotation angles may be used, as is known in the art. The Y direction movement or displacement $Y_{STYLUS}$ away from null (e.g., corresponding to the undeflected position UNDF) of the probe tip 448 of the stylus 406 in relation to the rotary motion tilt component $\theta_Y$ may be approximated as:

$$\Delta Y_{STYLUS} = \theta_Y * (h_S + l_S) \quad \text{(Eq. 2)}$$

where $h_S$ is the distance from the end of the stylus coupling portion 442 to the rotation center RC, and $l_S$ is the length of the stylus 406. Combining EQUATIONS 1 and 2, the ratio of the displacement ΔY of the disruptor element 451 in relation to the Y direction displacement at the probe tip 448 may be approximated as:

$$\Delta Y / \Delta Y_{STYLUS} = H/(h_S + l_S) \quad \text{(Eq. 3)}$$

It will be appreciated that the X coordinate motion components are analogous to the above expressions, and will not be explained in further detail herein. The stylus length $l_S$ for various styli may be utilized in the equations (e.g., with respect to the trigonometry of the system) for determining the X-Y position of the probe tip 448 based on the signals from the rotary sensing coils RSC (i.e., as indicating the X-Y position of the disruptor element 451). Regarding the Z coordinate displacement or position component, a displacement ΔZ (not shown) of the disruptor element 451 along the axial or Z direction away from null (e.g., corresponding to the undeflected position UNDF), in relation to the Z direction displacement $\Delta Z_{STYLUS}$ at a stylus contact portion (e.g., the probe tip 448) may be approximated as:

$$\Delta Z/\Delta Z_{STYLUS} \approx 1 \qquad \text{(Eq. 4)}$$

Figure 4A:
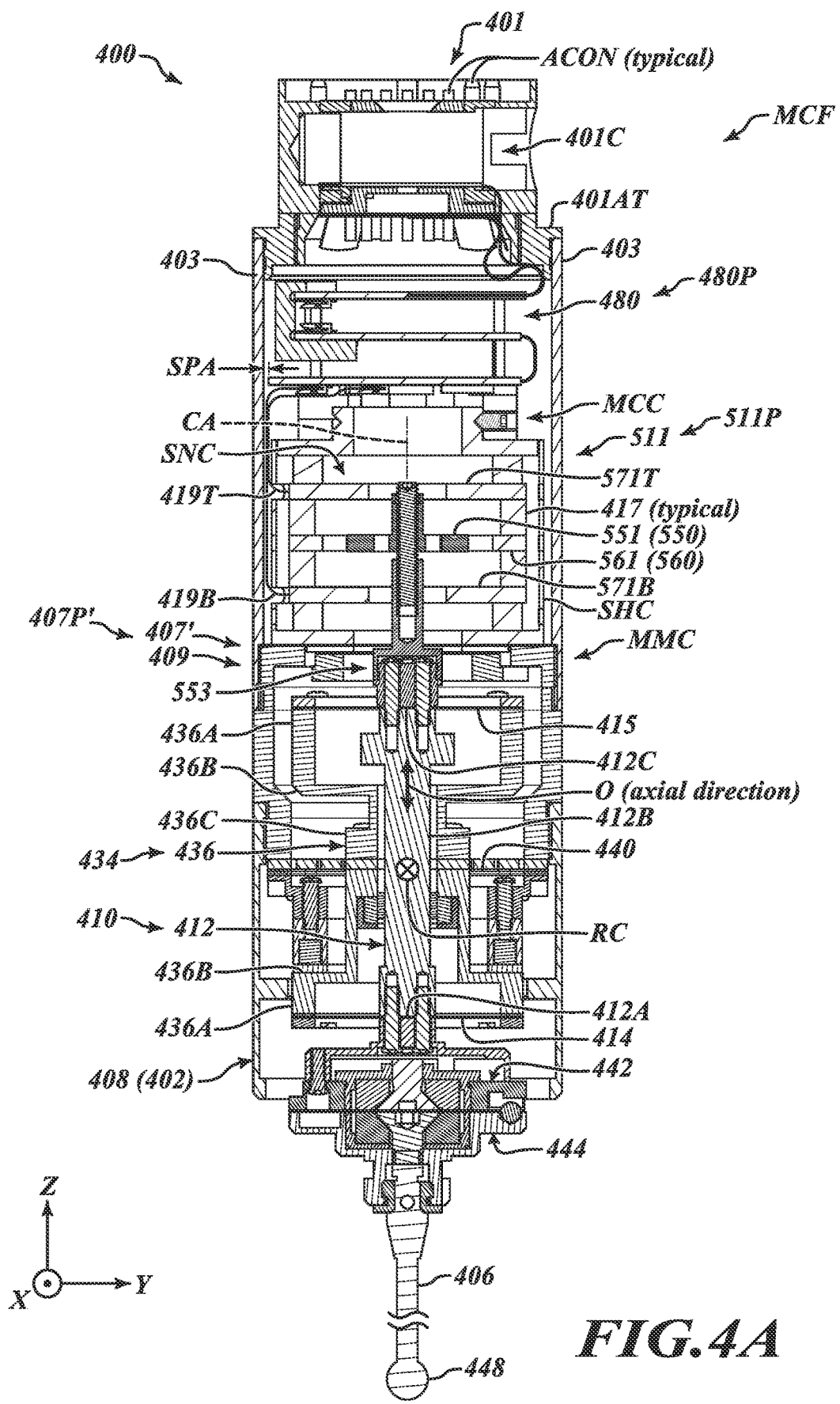
FIGS. 4A-4C are diagrams showing implementations of a stylus suspension module, a stylus position detection module, and a signal processing and control circuitry module of an assembled scanning probe.
Figure 4B:
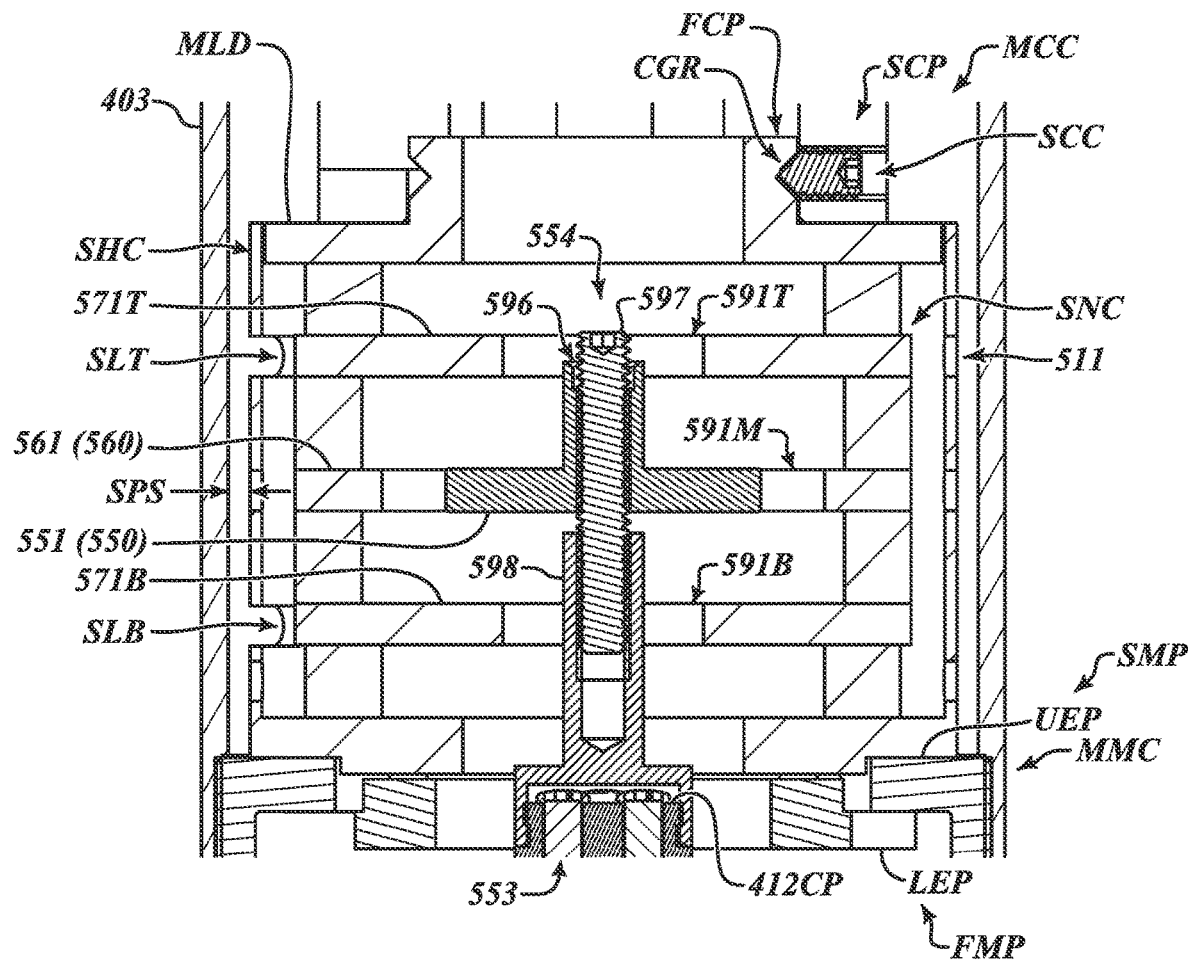
Figure 4C:
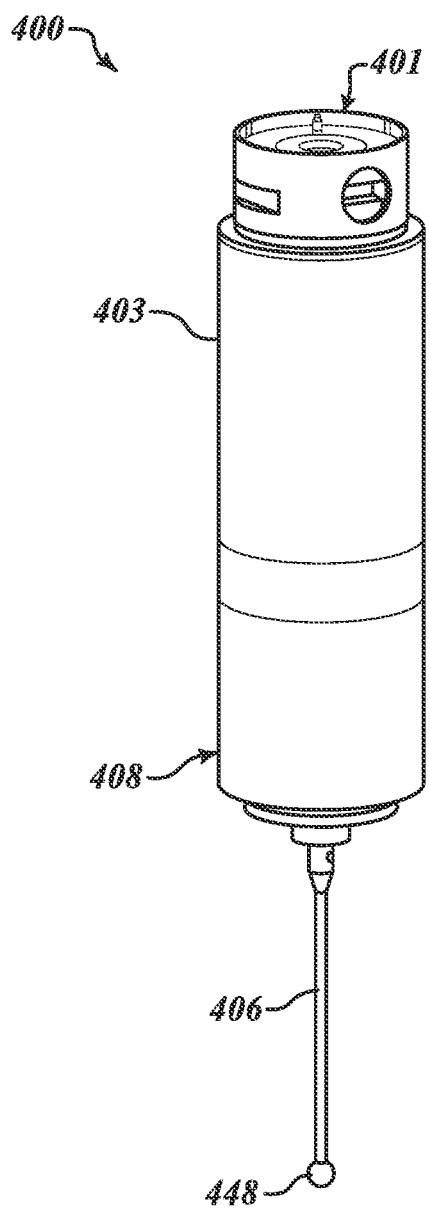

FIGS. 4A-4C are diagrams showing implementations of an assembled scanning probe 400. FIG. 4A is a partially schematic diagram showing a cross section of a stylus suspension module 407' of a stylus suspension portion 407P' (e.g., as may be usable as the stylus suspension module 407 represented in FIG. 3). Also shown in FIG. 4A is a stylus position detection module 511 of a stylus position detection portion 511P (e.g., that is similar to the stylus position detection module 411 shown in FIG. 3), and a signal processing and control circuitry module 480 of a signal processing and control circuitry portion 480P. The foregoing elements may be at least partially included within a probe cover 403 and main body frame 408 of a probe main body 402 of a scanning probe 400. In various implementations, the probe cover 403 may be cylindrical (e.g., as illustrated in FIG. 4C), and is configured to surround the stylus suspension module 407' and the stylus position detection module 511 (e.g., surrounding radially in directions perpendicular to the central axis CA) when the scanning probe 400 is assembled.

The substrates 571T, 571B, and the field generating coil 561 or its substrate (e.g., printed circuit type substrates) of a sensor configuration SNC of the stylus position detection module 511 may be positioned for proper operation in the scanning probe 400 using alignment and mounting portions 417, or other known techniques. Various signal connections associated with the stylus position detection module 511 may be provided by electrical connectors 419 (e.g., 419B and 419T; flex print and/or wire connections), or the like, according to known techniques. In some implementations, some or all of the circuitry of the signal processing and control circuitry portion 480P may be provided as a separate circuit assembly as represented in FIG. 4A (i.e., as included in the signal processing and control circuitry module 480). In other implementations, some of the circuitry of the signal processing and control circuitry portion 480P may be combined on the substrates of the stylus position detection module 511, if desired.

As shown in FIG. 4A, the stylus suspension module 407' includes a stylus motion mechanism 409 and a stylus coupling portion 442 which is coupled to a stylus 406. The stylus motion mechanism 409 may include a moving member 412, a rotating member 436, a flexure element 440 (e.g., coupled to the frame of the stylus suspension module 407' as coupled to the main body frame 408 for supporting and enabling rotary motion of the rotating member 436), and flexure elements 414 and 415 (i.e., referenced as first flexure elements) supporting the moving member 412 and coupling it to the rotating member 436 for enabling axial motion of the moving member 412. The scanning probe 400 includes the stylus position detection module 511 having components and operation for determining the position and/or motion of the stylus motion mechanism 409 and/or the probe tip 448 of the stylus 406.

The flexure element 440 (i.e., referenced as a second flexure element) may be disposed between the respective planes of a pair of flexure elements 414 and 415 (i.e., referenced as first flexure elements) in the axial direction θ. Flexure designs suitable for the flexure elements 414, 415 and 440 may be determined according to principles known in the art. For example, one possible implementation is illustrated in U.S. Pat. No. 9,791,262, which is hereby incorporated herein by reference in its entirety. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although it will be appreciated that such an implementation is exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the probe tip 448 to move in the axial direction θ. The rotary motion mechanism 434 including the rotating member 436 allows the probe tip 448 of the stylus 406 to move transverse (e.g., approximately perpendicular) to the axial direction θ by means of rotary motion about the rotation center RC.

The moving member 412 integrally includes: a lower portion 412A; a rod portion 412B; and an upper portion 412C. As previously outlined with reference to FIG. 3, the disruptor element 551 that is attached to the upper portion 412C of the moving member 412 functions as both a rotary and axial position indicating element. The rod portion 412B is disposed between the pair of first flexure elements 414 and 415. The rod portion 412B is housed in the rotating member 436. The lower portion 412A is formed below the rod portion 412B and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, or when intentionally changing styli, etc.)

The scanning probe 400 includes an autojoint connection portion 401 (e.g., for attaching to an attachment portion of a CMM, such as the drive mechanism attachment portion 224 of the CMM 200 of FIG. 1). In various implementations, the autojoint connection portion 401 may comprise precise kinematic mounting features and electrical connections that provide a physical interface that is common to various interchangeable CMM probes or sensors, according to known principles. An exemplary known technique and mechanism usable for automatic exchange of a CMM probe to and from a kinematic mounting at an autojoint is described in U.S. Pat. No. 4,651,405, which is hereby incorporated herein by reference in its entirety. In various implementations, the autojoint connection portion 401 may include autojoint connecting elements ACON (e.g., electrical connecting elements, etc.), which may connect to or though components in an autojoint components portion 401C.

FIG. 4B illustrates a portion of the scanning probe 400 as including the stylus position detection module 511. Certain electrical connectors 419 are not shown in FIG. 4B in order to more clearly illustrate certain spatial relationships relative to the probe cover 403. As illustrated at least in part in FIG. 4B, the probe cover 403 does not contact the stylus position detection module 511 (e.g., including any of the rigid components of the stylus position detection module 511) at any point, and for which it will be appreciated there is a corresponding spacing between the probe cover 403 and the stylus position detection module 511 at all points surrounding the stylus position detection module 511. In various implementations, the amount of spacing between the probe cover 403 and the stylus position detection module 511 (e.g., between the inner surface of the probe cover 403 and an outer surface of the stylus position detection module 511, such as an outer surface of the shield configuration SHC) may vary at different points around the stylus position detection module 511. A minimum spacing SPS (e.g., as illustrated in FIG. 4B) may be designated as occurring at a closest distance between the probe cover 403 and the stylus position detection module 511, for which the spacing from the probe cover 403 at all other points around the stylus position detection module 511 may be equal to or greater than the minimum spacing SPS. As an example, in some implementations, a minimum spacing SPS may fall within a range between 0.2 mm and 2.0 mm (e.g., such as having a value of approximately 0.8 mm).

In accordance with various embodiments, the shield configuration SHC allows for the sensor configuration SNC to be isolated electromagnetically and mechanically from influences within the scanning probe 400. The shield configuration SHC can be a single-piece component or a multipiece component depending on a particular application.

Similarly, the probe cover 403 also does not contact the signal processing and control circuitry module 480 (e.g., including any of the rigid components of the signal processing and control circuitry module 480) at any point (e.g., as best illustrated in FIG. 4A), and for which it will be appreciated that there is a corresponding spacing between the probe cover 403 and the signal processing and control circuitry module 480 at all points surrounding the signal processing and control circuitry module 480. In various implementations, the amount of spacing between the probe cover 403 and the signal processing and control circuitry module 480 (e.g., between the inner surface of the probe cover 403 and an outer surface of the signal processing and control circuitry module 480) may vary at different points around the signal processing and control circuitry module 480. A minimum spacing SPA (e.g., as illustrated in FIG. 4A) may be designated as occurring at a closest distance between the probe cover 403 and the signal processing and control circuitry module 480, for which the spacing from the probe cover 403 at all other points around the signal processing and control circuitry module 480 may be equal to or greater than the minimum spacing SPA.

In various implementations, the shield configuration SHC includes horizontal slots SL (e.g., SLB and SLT; oriented perpendicular to the central axis CA) for enabling electrical connectors 419 to pass through. As will be described in more detail below with respect to FIGS. 8A-8D, in various implementations it may be desirable for any slots to be horizontal (i.e., rather than vertical, etc.) As indicated in FIG. 4B, the shield configuration SHC includes a top horizontal slot SLT, which is configured to receive a top electrical connector 419T from the signal processing and control circuitry module 480 for connecting to the coils of the top coil substrate 571T (as indicated in FIG. 4A), and a bottom horizontal slot SLB, which is configured to receive a bottom electrical connector 419B from the signal processing and control circuitry module 480 for connecting to the coils of the bottom coil substrate 571B (as indicated in FIG. 4A). As indicated in FIG. 4A, portions of the electrical connectors 419T and 419B are provided and pass through the spacing between the stylus position detection module 511 and the probe cover 403.

As indicated in FIGS. 4A and 4B, the stylus position detection module 511 may be mounted to the stylus suspension module 407' by a module mounting configuration MMC, and the signal processing and control circuitry module 480 may be coupled to the stylus position detection module 511 by a module coupling configuration MCC. As will be described in more detail below (e.g., with respect to FIGS. 8D, 9 and 10), as part of the module mounting configuration MMC, the stylus position detection module 511 may include a first mounting portion FMP, and the stylus suspension module 407' may include a second mounting portion SMP. The first mounting portion FMP may include lower extension portions LEP which are configured to be located at least partially beneath and contact upper extension portions UEP of the second mounting portion SMP as part of the mounting process.

In various implementations, as part of the module coupling configuration MCC, the stylus position detection module 511 includes first coupling portion FCP (e.g., as included on a module lid portion MLD of the stylus position detection module 511), and the signal processing and control circuitry module 480 includes a second coupling portion SCP. As part of the coupling process, the second coupling portion SCP is configured to be coupled to the first coupling portion FCP for coupling the signal processing and control circuitry module 480 to the stylus position detection module 511. In various implementations, the first coupling portion FCP comprises a receiving portion CGR (e.g., a circular groove, see FIG. 8C) that is configured to receive securing components SCC (e.g., set screws) of the second coupling portion SCP. More specifically, as part of a coupling process, the securing components SCC (e.g., set screws) are rotated in threaded holes of the second coupling portion SCP to extend into the receiving portion CGR of the first coupling portion FCP for securing the second coupling portion SCP to the first coupling portion FCP and thus rigidly coupling the signal processing and control circuitry module 480 to the stylus position detection module 511.

As will be described in more detail below with respect to FIG. 11, a disruptor assembly 554 of the scanning probe comprises the disruptor configuration 550 (including the disruptor element 551), a pocket element 596, an adjustment component 597 (e.g., a set screw), and a spindle 598. In various implementations, as part of a disruptor coupling configuration 553, the upper portion 412C of the moving member 412 of the stylus suspension module 407' may include or have a designated upper coupling portion 412CP (e.g., either as part of or rigidly attached to the upper portion 412C), which the spindle 598 rigidly couples to. In relation to the disruptor assembly 554, as illustrated in FIG. 4B, top and bottom holes 591T and 591B are included in the substrates 571T and 571B, and a middle hole 591M is included in the substrate for the field generating coil configuration 560. As will be described in more detail below, during an assembly process, the top hole 591T in the substrate 571T may provide access to the disruptor configuration 550 (e.g., for adjusting the position of the disruptor element 551). The middle hole 591M and the bottom hole 591B may provide room for the disruptor element 561 and spindle 598, respectively, to move during operations of the scanning probe 400 (e.g., in relation to rotary motion of the probe tip 448, etc.)

FIG. 4C is a three dimensional view of the scanning probe 400. As indicated in FIG. 4C, the stylus 406 with the probe tip 448 is attached at the bottom of the scanning probe 400 (e.g., as attached to the stylus suspension module 407' which may be included within a main body frame 408, as indicated in FIG. 4A). The probe cover 403 is provided on an upper portion of the scanning probe 400 (e.g., as may surround the signal processing and control circuitry module 480 and the stylus position detection module 511 as indicated in FIG. 4A). The autojoint connection portion 401 is illustrated at the top (i.e., proximal end) of the scanning probe 400 (e.g., for attaching to an attachment portion of a CMM, such as the drive mechanism attachment portion 224 of the CMM 200 of FIG. 1). In various implementations, the autojoint connection portion 401 including the autojoint connecting elements ACON (see FIG. 4A) may be configured to connect to a CMM in only one way (e.g., in a single specified angular orientation in relation to rotation around the central axis CA).

In various implementations, it may generally be desirable for the modules of the scanning probe to be generally aligned in a preferred angular orientation (i.e., relative to rotation around the central axis) relative to the drive mechanism attachment portion 224 (e.g., such that rotary (e.g., X, Y) position signals of the scanning probe are generally aligned with X and Y position signals of the X axis and Y axis movement mechanisms 222 and 221 and/or in relation to systems that automatically change out hardware that is expected to be in a particular orientation as part of the automated processes, etc.) In order to achieve such alignment, it is generally desirable for the modules of the scanning probe to have a preferred angular alignment relative to the autojoint connection portion and correspondingly the drive mechanism attachment portion 224 (e.g., for which the autojoint connection portion 401 may only connect to the drive mechanism attachment portion 224 in one way with a set angular orientation between the two portions). Thus, it may be desirable to assemble the scanning probe 400 including the angular orientations of the modules so as to have such preferred angular orientations and corresponding alignment.

As an example, in relation to the configuration of FIGS. 4A-4C, as part of the scanning probe assembly process, the autojoint connection portion 401 may be one of the last installed portions, and may be angularly adjusted (e.g., with rotational adjustment around the central axis) relative to the stylus suspension module 407' and other modules of the scanning probe in order to be at a preferred angular orientation. Such process may also be described as "clocking" the autojoint connection portion 401 to one or more of the modules (e.g., the stylus suspension module 407'). In various implementations, a circular attachment portion 401AT may be utilized to attach the autojoint connection portion 401 to the rest of the scanning probe (e.g., to attach to a top part of a probe cover 403 utilizing an adhesive). The circular attachment portion 401AT may have a top part that rigidly attaches to the autojoint connection portion 401, and a bottom part that is attached (e.g., utilizing adhesive) to the rest of the scanning probe (e.g., to attach to a top part of the probe cover 403). In one implementation, the bottom part of the circular attachment portion 401AT may be rotatable within the top part of the probe cover 403 before the adhesive sets. Such a configuration enables the autojoint connection portion 401 to be "clocked" or otherwise angularly adjusted relative to the stylus suspension module 407' and/or other modules in order to achieve the desired angular orientations and corresponding alignments, after which the adhesive is allowed to set for maintaining the orientations.

In operation, the scanning probe 400 may be utilized for measuring a surface of a workpiece W (e.g., see FIG. 1). In various implementations, at least some signal errors (e.g., of the signals of the sensing coils of the sensor configuration SNC which are indicative of an axial position and a rotary position of the disruptor element 551, the stylus coupling portion 442, the stylus 406, and/or the probe tip 448) may occur due to crosstalk or other interference between components (e.g., between one or more components of a first module and one or more components of a second module and/or other influences outside the probe). For example, in some implementations, crosstalk may refer to an instance where a signal or field generated by or in one circuit, channel or component of a system creates an undesired effect in another circuit, channel or component of the system (e.g., due to undesirable electromagnetic coupling or otherwise). In addition, certain external components or systems (e.g., workpieces and/or other components or systems in a workplace environment, etc.) may be sources of undesired effects. For example, in relation to certain configurations of scanning probes such as those described herein, crosstalk may otherwise occur between any of the components of or in the sensor configuration SNC of the stylus position detection module 511 (e.g., the field generating coil configuration, the sensing coil configuration, and/or the disruptor configuration) and components of the other modules (e.g., of the signal processing and control circuitry module 480 and/or the stylus suspension module 407') and/or other influences outside the probe (e.g., of workpieces and/or other components or systems in a workplace environment, etc.). In accordance with principles disclosed herein, the shield configuration SHC reduces crosstalk or other interference that would otherwise be caused by the components and/or operations of at least one of the signal processing and control circuitry module 480 or the stylus suspension module 407' (e.g., and/or other outside influences) and that would otherwise affect the signals of the sensing coils of the sensor configuration SNC if the shield configuration SHC was not present around the sensor configuration (e.g., for which such affects may otherwise result in errors in three-dimensional position information that is determined based on the signals generated by sensing coils of the sensor configuration SNC of the scanning probe 400). In relation to such concepts, various principles of operation for signals generated by sensing coils of a scanning probe are described in more detail below with respect to FIGS. 5 and 6.

Figure 5:
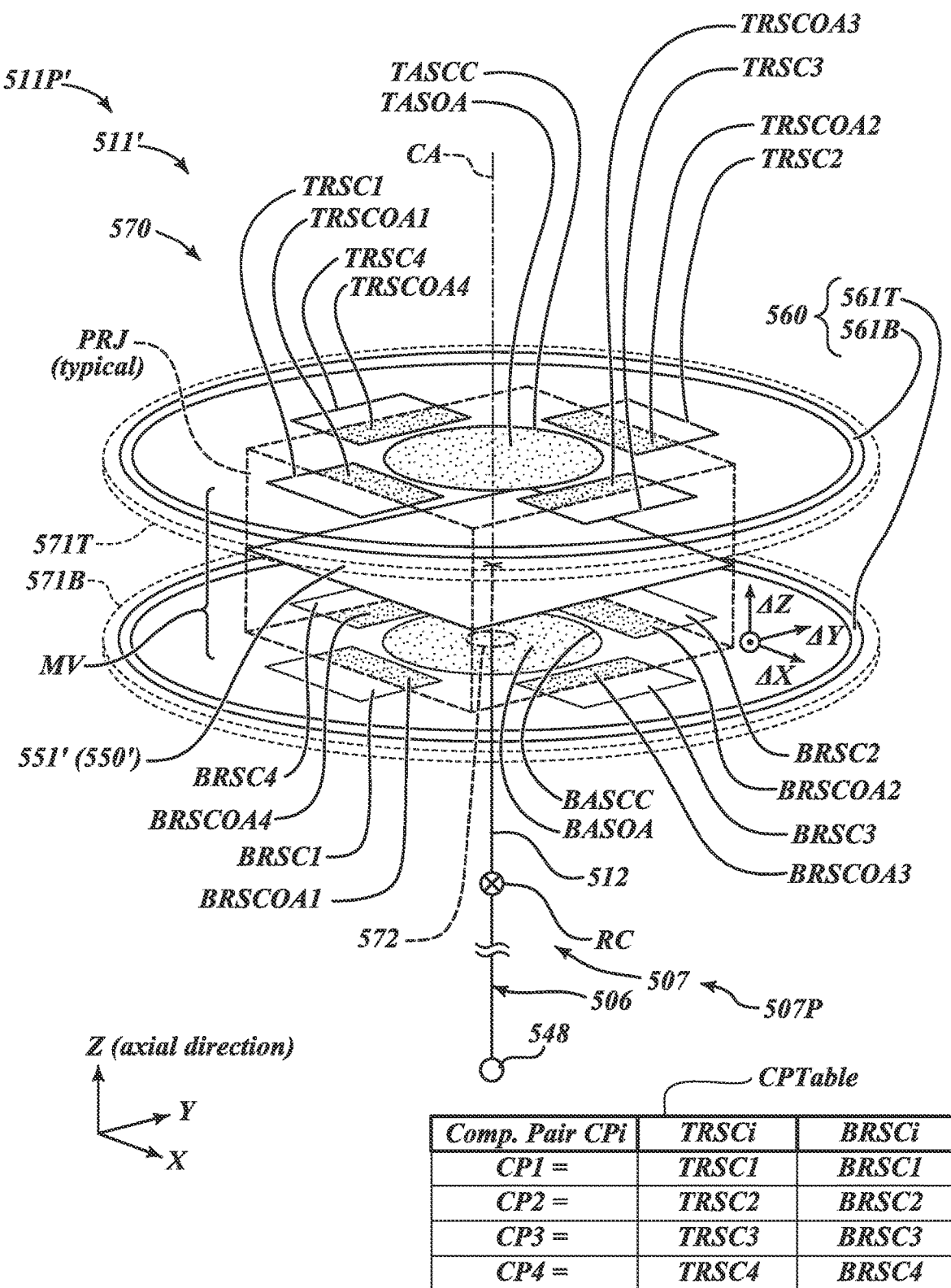
FIG. 5 is a partially schematic isometric diagram showing an alternative implementation of the stylus position detection module shown in FIGS. 3 and 4A-4C.

FIG. 5 is a partially schematic isometric diagram of an implementation of a stylus position detection module 511' of a stylus position detection portion 511P' that is similar to a stylus position detection module 511 of the stylus position detection portion 511P shown in FIG. 4A, emphasizing certain aspects. The stylus position detection modules 511' and 511 are similar except for a difference in the field generating coil configuration 560, as explained further below. In general, the stylus position detection module 511' includes certain components that are similar to those of the stylus position detection modules 311, 411 and 511 of FIGS. 2, 3 and 4, and will be understood to operate similarly except as otherwise described below.

Figure 6:
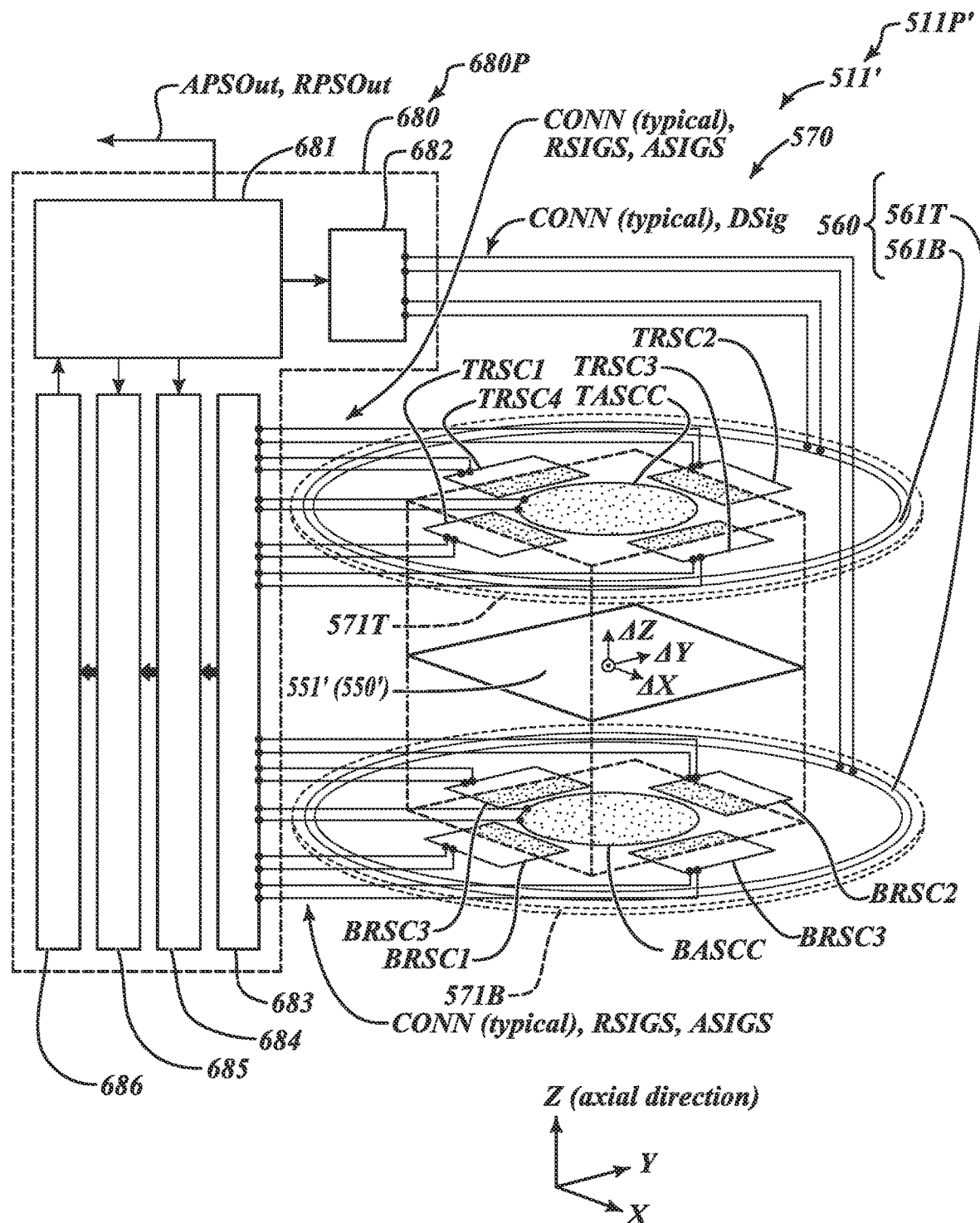
FIG. 6 is a partially schematic isometric diagram showing certain elements of the stylus position detection module shown in FIG. 5 and of a signal processing and control circuitry module.

In the implementation shown in FIG. 5, the stylus position detection module 511' comprises the receiver coil portion 570, the disruptor configuration 550' comprising the disruptor element 551', and the field generating coil configuration 560. In various implementations, disruptor element 551' (or more generally the disruptor configuration 550') may comprise a conductive plate or conductive loop, or parallel conductive plates or conductive loops (e.g., as fabricated on two sides of a printed circuit substrate, patterned by printed circuit board fabrication techniques), or any other desired operational configuration that provides a disruptor area (e.g., its interior area). In the examples of FIGS. 5 and 6, the disruptor element 551' is generally represented as a conductive plate with a square shape. In other implementations (e.g., in the examples of FIGS. 4A and 4B), the disruptor element (e.g., disruptor element 551) may be a conductive element with a different shape (e.g., may have a circular shape), with a configuration and dimensions of the conductive element as indicated in FIGS. 4A, 4B and 11. In general, it will be appreciated that disruptor elements with different shapes may be utilized in accordance with the principles disclosed herein.

In regard to the example of FIG. 5, the disruptor element 551' is located along the central axis CA in the disruptor motion volume MV between the top and bottom coil substrates 571T and 571B and is coupled to the stylus suspension module 507 of the stylus suspension portion 507P by a disruptor coupling configuration 553 (e.g., comprising the moving member 512). For purposes of explanation, the disruptor element 551' may be described as moving relative to the undeflected position illustrated in FIG. 5 (see the undeflected position UNDF, in FIG. 3) in response to a deflection of the stylus suspension module 507 and/or the stylus 506 and/or the moving member 512. The disruptor element may be described as moving with displacement increments $\Delta Z$ over an operating motion range+/−Rz along the axial direction in response to axial motion, and with displacement increments $\Delta X$ and $\Delta Y$ over respective operating motion ranges+/−Rx and +/−Ry along orthogonal X and Y directions that are orthogonal to the axial direction (Z direction) in response to rotary motion. The specified or expected operating motion ranges are described in greater detail below.

The receiver coil portion 570 may comprise the planar top coil substrate 571T including N top rotary sensing coils TRSC (e.g., TRSC1-TRSC4, where N=4) and a top axial sensing coil configuration TASCC (e.g., comprising the single illustrated individual coil in this implementation), and a planar bottom coil substrate 571B including N bottom rotary sensing coils BRSC (e.g., BRSC1-BRSC4, where N=4) and a bottom axial sensing coil configuration BASCC (e.g., comprising the single illustrated individual coil in this implementation). The top and bottom coil substrates 571T and 571B are mounted in a fixed relationship with the bottom coil substrate closer to the stylus 506 and/or the stylus suspension module 507. The top and bottom coil substrates 571T and 571B may be nominally parallel to one another and nominally orthogonal to the central axis CA, and are spaced apart along the central axis CA with the disruptor motion volume MV located therebetween. It should be appreciated that although the various sensing coils shown in FIG. 5 are represented by "closed loops" for simplicity of illustration, all coils comprise windings or conductors that have first and second connection ends (e.g., as represented in FIG. 6) that are configured to operate as one or more inductively coupled "turns".

The field generating coil configuration (e.g., the field generating coil configuration 560) generally comprises at least a first field generating coil that is located proximate to the disruptor motion volume MV and that is nominally planar and orthogonal to the central axis CA. In contrast to the single planar field generating coil 461 in the implementation shown in FIG. 3 (which is located approximately at a midplane of the disruptor motion volume MV), in the implementation shown in FIG. 5, the field generating coil configuration 560 comprises a pair of planar field generating coils 561T and 561B (located on the top and bottom coil substrates 571T and 571B, respectively) that is approximately equidistant from a midplane of the disruptor motion volume MV along the central axis CA, and that are nominally planar and orthogonal to the central axis CA. Generally speaking, either of the field generating coil configurations 460 or 560 may be used with the receiver coil portion 570. In certain implementations, it may be desirable that the field generating coil configuration comprises at least a first field generating coil that is configured such that a projection of its coil area along the axial direction (Z direction) encompasses the conductive plate or loop that provides the disruptor area of the disruptor configuration 550 (e.g., of the disruptor element 551') and a coil area of all the rotary and axial sensing coils RSCi and ASCC located on the top and bottom coil substrates 571T and 571B. In general, the field generating coil configuration is configured to generate a changing magnetic flux generally along the axial direction in the disruptor motion volume MV in response to a coil drive signal, as desired for operation of the stylus position detection module 511'. It should be appreciated that, although the various field generating coils shown in FIG. 5 are represented by a single "closed loop" comprising a wide flat conductive trace (the edges of which are shown) for simplicity of illustration, in an actual device all coils comprise windings or conductors that have first and second connection ends (e.g., as represented in FIG. 6), and are configured to operate as one or more field generating "turns".

As illustrated in FIG. 5, a projection of the disruptor element 551' along the axial direction (e.g., as shown by fine dashed lines PRJ in FIG. 5) through an interior coil area of the top axial sensing coil configuration TASCC defines a top axial sensing overlap area TASOA (indicated by a dot pattern filling that interior coil area), and a projection of the disruptor element 551' along the axial direction through an interior coil area of the bottom axial sensing coil configuration BASCC defines a bottom axial sensing overlap area BASOA (indicated by a dot pattern filling that interior coil area). Similarly, a projection of the disruptor element 551' along the axial direction through an interior coil area of any respective top rotary sensing coil TRSCi (e.g., TRSC1-TRSC4) defines a respective top rotary coil sensing overlap area TRSCOAi (e.g., TRSCOA1-TRSCOA4), as indicated by a dot pattern filling the various respective overlap areas shown in FIG. 5, where i is an individual coil identification index in the range 1 to N. A projection of the disruptor element 551' along the axial direction through an interior coil area of any respective bottom rotary sensing coil BRSCi (e.g., BRSC1-BRSC4) defines a respective bottom rotary coil sensing overlap area BRSCOAi (e.g., TRSCOA1-TRSCOA4), as indicated by a dot pattern filling the various respective overlap areas shown in FIG. 5.

Regarding axial position detection in a stylus position detection module (e.g., 511'), the receiver coil portion (e.g., 570) and the disruptor element (e.g., 551') are generally configured to provide a top axial sensing overlap area TASOA and bottom axial sensing overlap area BASOA wherein an amount of each of the overlap areas TASOA and BASOA is unchanged or independent of the position of the disruptor element 551' within operating motion ranges+/−Rz, +/−Rx, and +/−Ry. It will be appreciated that, for a particular scanning probe, the operating motion ranges may be prescribed or specified in combination with the configuration of the probe's particular stylus position detection module, if needed, in order to fulfill this requirement. In this way, the signal components generated in the top and bottom axial sensing coil configurations TASCC and BASCC are nominally independent of the rotary motion (that is the position of the disruptor element 551' along the X and Y directions), and are nominally sensitive only to variations in "proximity" or gap to the disruptor element 551', which varies depending on the axial (Z) position or displacement ΔZ of the disruptor element 551'. In operation, currents induced in the disruptor element 551' by the changing magnetic field of the field generating configuration 560 cause opposing magnetic fields. Generally speaking, as the disruptor element 551' moves upward along the axial (Z) direction in FIG. 5, the opposing magnetic fields couple more strongly to the top axial sensing coil configurations TASCC, reducing its signal component that arises from the changing magnetic field. Conversely, the opposing magnetic fields couple more weakly to the bottom axial sensing coil configurations BASCC, increasing its signal component that arises from the changing magnetic field. By a convention used in this disclosure, we may refer to a signal component SIGTASCC as the signal component arising from a particular top axial sensing coil configuration (or coil) TASCC, and so on.

It will be appreciated that at the undeflected position UNDF, the net signal components SIGTASCC and SIGBASCC may be approximately balanced. For small displacements ΔZ, such as those expected in operation, the net signal components SIGTASCC and SIGBASCC may vary approximately linearly, and inversely compared to one another. In one implementation, an axial displacement or position ΔZ may be indicated by, or correspond to, the signal relationship:

ΔZ=function of [(SIGBASCC−SIGTASCC)/
(SIGBASCC+SIGTASCC)]   (Eq. 5)

This signal relationship is exemplary only, and not limiting. In various implementations, this signal relationship may be adjusted or compensated by additional calibration or signal processing operations, including operations that reduce the effects of geometric and/or signal cross-coupling between various displacement directions or signal components, if desired. In various implementations, the top axial sensing coil configuration may comprise at least one top axial sensing coil that is not one of the N top rotary sensing coils and that is arranged closer to the central axis than the top rotary sensing coils, and the at least one top axial sensing coil and the disruptor element are characterized in that the at least one top axial sensing coil has an interior coil area that is smaller than the disruptor element, and a projection of the disruptor element along the axial direction completely fills the interior coil area of the at least one top axial sensing coil for any position of the disruptor element within the operating motion ranges+/−Rz, +/−Rx, and +/−Ry, whereby the top axial sensing overlap area TASOA is unchanged by the position of the disruptor element. Similarly, in various such implementations, the bottom axial sensing coil configuration may comprise at least one bottom axial sensing coil that is not one of the N bottom rotary sensing coils and that is arranged closer to the central axis than the bottom rotary sensing coils, and the at least one bottom axial sensing coil and the disruptor element are characterized in that the at least one bottom axial sensing coil has an interior coil area that is smaller than the disruptor element and a projection of the disruptor element along the axial direction completely fills the interior coil area of the at least one bottom axial sensing coil for any position of the disruptor element within the operating motion ranges+/−Rz, +/−Rx, and +/−Ry, whereby the bottom axial sensing overlap area TASOA is unchanged by the position of the disruptor element. It may be seen that the particular implementation of the stylus position detection module 511' shown in FIG. 5, wherein the top axial sensing coil configuration TASCC and the bottom axial sensing coil configuration BASCC each comprise a single sensing coil, conforms to this description. It will be appreciated that various configurations of the top and bottom axial sensing coil configurations TASCC and BASCC may be used, and the particular configurations shown in FIG. 5 are exemplary only and not limiting.

Regarding rotary position detection in a stylus position detection module (e.g., 511'), the receiver coil portion (e.g., 570) and the disruptor element (e.g., 551') are generally configured to provide N complementary pairs of rotary sensing coils CPi (e.g., CP1-CP4, where N=4) that each comprise a top rotary sensing coil TRSCi and a bottom rotary sensing coil BRSCi, wherein for any complementary pair CPi, and for any disruptor element displacement increment within the operating motion ranges+/−Rz, +/−Rx, and +/−Ry, the magnitude of the change in overlap areas TRSCOAi and BRSCOAi associated with that disruptor displacement increment is nominally the same in that complementary pair. It will be appreciated that for a particular scanning probe the operating motion ranges may be prescribed or specified in combination with the configuration of its particular stylus position detection module, if needed in order to fulfill this requirement. The table CPTable in FIG. 5 indicates the respective members TRSCi and BRSCi of each respective complementary pair CPi for the implementation shown in FIG. 5.

By conforming to the foregoing principle, the complementary pairs CPi shown in FIG. 5 may be used to compensate or eliminate certain cross-coupling errors, and/or to simplify the signal processing required to provide precise rotary position or displacement measurements (e.g., along the X and/or Y directions). In particular, pairs of signal components arising in complementary pairs CPi of rotary sensing coils in the implementation shown in FIG. 5 may be combined or processed in a relationship that provides a resulting output signal that is nominally insensitive to variations in "proximity" or gap between the individual coils of the complementary pair and the disruptor element 551'. That is, the resulting output signal may be insensitive to the axial (Z) position or displacement ΔZ of the disruptor element 551', and nominally only sensitive to a rotary position or displacement (e.g., along the X and/or Y directions), as described in greater detail below. For the particular implementation shown in FIG. 5, it may be understood that a displacement of the disruptor element 551' that has a displacement component ΔY along the Y axis direction will increase (or decrease) the overlap areas TRSCOA2 and BRSCOA2 in the complementary pair CP2 and decrease (or increase) the overlap areas TRSCOA1 and BRSCOA1 in the complementary pair CP1. Similarly, a displacement of the disruptor element 551' that has a displacement component ΔX along the X axis direction will increase (or decrease) the overlap areas TRSCOA3 and BRSCOA3 in the complementary pair CP3 and decrease (or increase) the overlap areas TRSCOA4 and BRSCOA4 in the complementary pair CP4.

As previous outlined, in operation, currents induced in the disruptor element 551' by the changing magnetic field of the field generating configuration 560 cause opposing magnetic fields. Generally speaking, the signal component SIGTRSCi (or SIGBRSCi) generated in any rotary sensing coil TRSCi (or BRSCi), will be reduced as a proximate portion of the disruptor element 551' comes closer to that rotary sensing coil along the axial direction, or increases its overlap TRSCOAi (or BRSCOAi) with the rotary sensing coil.

It will be appreciated that for the complementary pairs CP1-CP4 indicated in FIG. 5 (wherein the coils in a complementary pair CPi may be identical and aligned along the axial direction), at the illustrated undeflected position UNDF, the signal components in each complementary pair (e.g., SIGTRSC1 and SIGBRSC1) may be approximately balanced. According to previously outlined principles, for a portion of the disruptor element 551' proximate to a complementary pair (e.g., CP1), for small displacements $\Delta Z$ such as those expected in operation, the net signal components (e.g., SIGTRSC1 and SIGBRSC1) may vary approximately linearly, and inversely compared to one another. Thus, the sum of such signals for a complementary pair CPi may be nominally insensitive to a $\Delta Z$ associated with the proximate portion of the disruptor element 551'. Furthermore, in the implementation shown in FIG. 5, the edges of the disruptor element 551' may be parallel to the X and Y directions, such that, within the operating motion ranges+/−Rx and +/−Ry, a Y direction displacement component does not alter the rotary coil sensing overlap areas TRSCOA3, BRSCOA3, and/or TRSCOA4 and BRSCOA4, and an X direction displacement component does not alter the rotary coil sensing overlap areas TRSCOA2, BRSCOA2, and/or TRSCOA1 and BRSCOA1. Therefore, in one implementation, a rotary displacement or position component $\Delta X$ along the X direction may be indicated by or correspond to the following signal relationship, ideally regardless of $\Delta Z$ and/or $\Delta Y$:

$$\Delta X = \text{function of } [(\text{SIGTRSC3}+\text{SIGBRSC3}) - (\text{SIGTRSC4}+\text{SIGBRSC4})] \div [(\text{SIGTRSC3}+\text{SIGBRSC3}) + (\text{SIGTRSC4}+\text{SIGBRSC4})] \quad \text{(Eq. 6)}$$

Similarly, in one implementation, a rotary displacement or position component $\Delta Y$ along the Y direction may be indicated by or correspond to the following signal relationship, ideally regardless of $\Delta Z$ and/or $\Delta X$:

$$\Delta Y = \text{function of } [(\text{SIGTRSC2}+\text{SIGBRSC2}) - (\text{SIGTRSC1}+\text{SIGBRSC1})] \div [(\text{SIGTRSC2}+\text{SIGBRSC2}) + (\text{SIGTRSC1}+\text{SIGBRSC1})] \quad \text{(Eq. 7)}$$

These signal relationships are exemplary only, and not limiting. In various implementations, these signal relationships may be adjusted or compensated by additional calibration or signal processing operations, including operations that reduce the effects of geometric and/or signal cross-coupling between various displacement directions or signal components, if desired.

In some particularly advantageous implementations, the receiver coil portion (e.g., 570) and the disruptor element (e.g., 551') are configured wherein, for any complementary pair CPi and any disruptor element displacement increment within the operating motion ranges+/−Rz, +/−Rx, and +/−Ry, both the magnitude and sign of the change in overlap areas TRSCOAi and BRSCOAi associated with that disruptor displacement increment are the same in that complementary pair. In some such implementations, the receiver coil portion is configured wherein each complementary pair CPi comprises a top rotary sensing coil TRSCi and a bottom rotary sensing coil BRSCi characterized in that the shape of their interior areas nominally coincide when projected along the axial direction. It may be seen that the particular implementation of the stylus position detection module 511' shown in FIG. 5 conforms to this description. However, it will be appreciated that various configurations of complementary pairs may be used, and the particular configurations shown in FIG. 5 are exemplary only and not limiting.

In some implementations, the receiver coil portion (e.g., 570) and the disruptor element (e.g., 551') may be configured wherein the disruptor element comprises at least N straight sides, and, for any respective complementary pair CPi, a respective one of the straight sides of the disruptor element transects both the top rotary sensing coil TRSCi and the bottom rotary sensing coil BRSCi of that respective complementary pair. In some such implementations, N=4, and the at least N straight sides include 4 sides that are arranged parallel to the sides of a rectangular or square shape. It may be seen that the particular implementation of the stylus position detection module 511' shown in FIG. 5 conforms to this description. However, it will be appreciated that various combinations of complementary pairs configurations and disruptor element edge configurations may be used, and the combination of the particular configurations shown in FIG. 5 is exemplary only and not limiting. In particular, in other implementations, the disruptor may have a circular or other shape (e.g., as may correspond to the implementations of FIGS. 4A-4C, etc.)

FIG. 6 is a partially schematic isometric diagram of certain elements of the stylus position detection module 511' shown in FIG. 5, including schematically represented connections CONN to a block diagram of one exemplary implementation of signal processing and control circuitry module 680 of a signal processing and control circuitry portion 680P. As shown in FIG. 6, the signal processing and control circuitry module 680 is operably connected to the various coils of the stylus position detection module 511'. In the implementation shown in FIG. 6, the signal processing and control circuitry module 680 comprises a digital controller/processor 681, that may govern various timing and signal connection or exchange operations between its various interconnected components, which include a drive signal generator 682, an amplification/switching portion 683, a sample and hold portion 684, a multiplexing portion 685, and an A/D convertor portion 686. The digital controller/processor 681 may also perform various digital signal processing operations to determine the output signals APSOut and RPSOut, as previously outlined with reference to FIG. 2. Portions of the design and operation of the signal processing and control circuitry module 680 may generally be recognized and understood by one of ordinary skill in the art, according to known principles. For example, in one implementation, the certain elements of the signal processing and control circuitry module 680 may be designed and operated by analogy to corresponding elements disclosed in U.S. Pat. No. 5,841,274, which is hereby incorporated herein by reference in its entirety.

In operation, the drive signal generator 682 is operated to provide a changing coil drive signal Dsig (e.g., a pulse) to the field generating coil configuration 560, which generates a changing magnetic flux generally along the axial direction in the disruptor motion volume MV in response to the coil drive signal. In the illustrated configuration, the top field generating coil 561T and the bottom field generating coil 561B are configured to provide changing magnetic fluxes that reinforce one another. The amplification/switching portion 683 is configured to input the signals RSIGs and ASIGs from the receiver coil portion 570, comprising respective signal components provided by the respective rotary and axial sensing coils located on the top and bottom coil substrates (e.g., the previously outlined signal components SIGTASCC, SIGBASCC, SIGTRSC1-SIGTRSC4, and SIGBRSC1-SIGBRSC4). In some implementations, the amplification/switching portion 683 may include switching circuits which may combine various analog signals to provide various desired sum or difference signals (e.g., by appropriate serial or parallel connections, or the like), for example as prescribed in the relationships shown in EQUATIONS 5-7, or the like. However, in other implementations, the amplification/switching portion 683 may perform only amplification and signal conditioning operations (e.g., and possibly signal inversion operations), with all signal combination operations performed in other circuit portions.

The sample and hold portion 684 inputs the various analog signals from the amplification/switching portion 683, and performs sample and hold operations according to known principles, e.g., to simultaneously sample and hold all respective signal components that arise from the various respective sensing coils of the receiver coil portion 570. In one implementation, the multiplexing portion 685 may connect various signals to the A/D convertor portion 686 sequentially, and/or in combinations related to various desired signal relationships (for example, as prescribed in the relationships shown in EQUATIONS 5-7, or the like). The A/D convertor portion 686 outputs corresponding digital signal values to the digital controller/processor 681.

The digital controller/processor 681 may then process and/or combine the digital signal values according to various desired relationships (for example, as prescribed in the relationships shown in EQUATIONS 5-7, or the like), to determine and output the output signals APSOut and RPSOut, which are indicative of the axial position and the rotary position of at least one of the disruptor element 551' or the stylus 506 (e.g., relative to the frame of the scanning probe). In some implementations the digital controller/processor 681 may be configured such that the output signals APSOut and RPSOut directly indicate the three-dimensional position of the stylus 506 or its probe tip 548 (e.g., relative to the frame of the scanning probe). In other implementations, it may be configured to output signals that indirectly indicate the three-dimensional position of the stylus 506 or its probe tip 548 (e.g., relative to the frame of the scanning probe), and a host system (e.g., a CMM) may input such signals and perform additional processing to further combine or refine such signals and determine the three-dimensional position of the stylus 506 or its probe tip 548 relative to the scanning probe and/or relative to an overall coordinate system used for CMM measurements.

Figure 7:
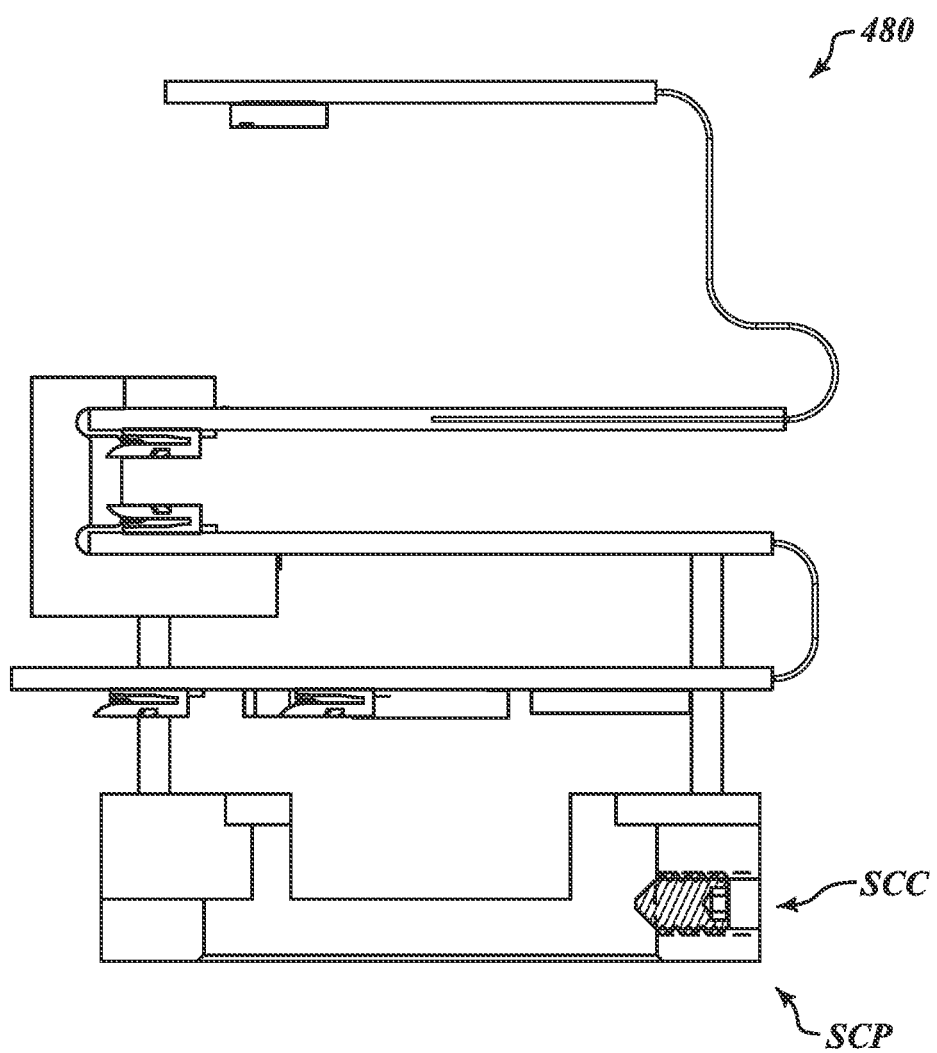
FIG. 7 is a diagram showing an implementation of the signal processing and control circuitry module of FIG. 4A and as may include circuitry similar to that of FIG. 6.

FIG. 7 is a diagram showing an implementation of the signal processing and control circuitry module 480 of FIG. 4A. In various implementations, the signal processing and control circuitry module 480 may include circuitry similar to that of FIG. 6 (e.g., as may be included on or in circuit boards and/or other components). The signal processing and control circuitry module 480 includes the second coupling portion SCP (e.g., as part of the module coupling configuration MCC for coupling to the first coupling portion FCP of the stylus position detection module 511). A securing component SCC (e.g., a set screw) of the second coupling portion SCP is illustrated. As described above, as part of the coupling process, the securing component SCC (e.g., set screw) is rotated in the threaded hole of the second coupling portion SCP to extend into a receiving portion CGR of the first coupling portion FCP for securing the second coupling portion SCP to the first coupling portion FCP and thus rigidly coupling the signal processing and control circuitry module 480 to the stylus position detection module 511.

Figure 8A:
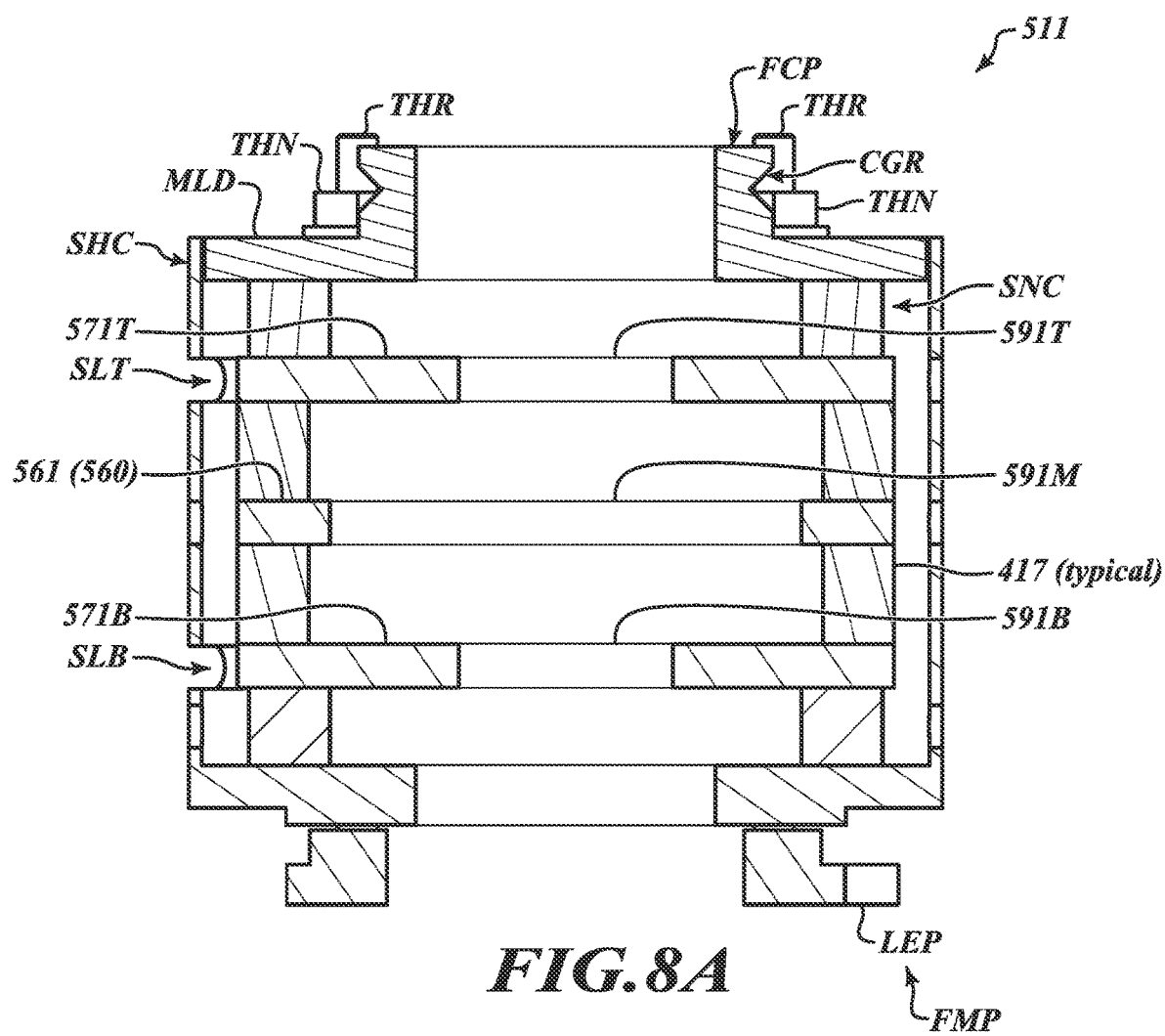
FIGS. 8A-8D are diagrams showing an implementation of the stylus position detection module of FIG. 4A.

FIGS. 8A-8D are diagrams showing an implementation of the stylus position detection module 511 of FIG. 4A. As indicated in FIG. 8A, the stylus position detection module 511 includes the substrates 571T, 571B, and the field generating coil 561 and its substrate (e.g., printed circuit type substrates), and the alignment and mounting portions 417 of the sensor configuration SNC, as surrounded by the shield configuration SHC. Various other components and aspects of the stylus position detection module 511 of FIG. 8A are described in more detail above with respect to FIG. 4B.

Figure 8B:
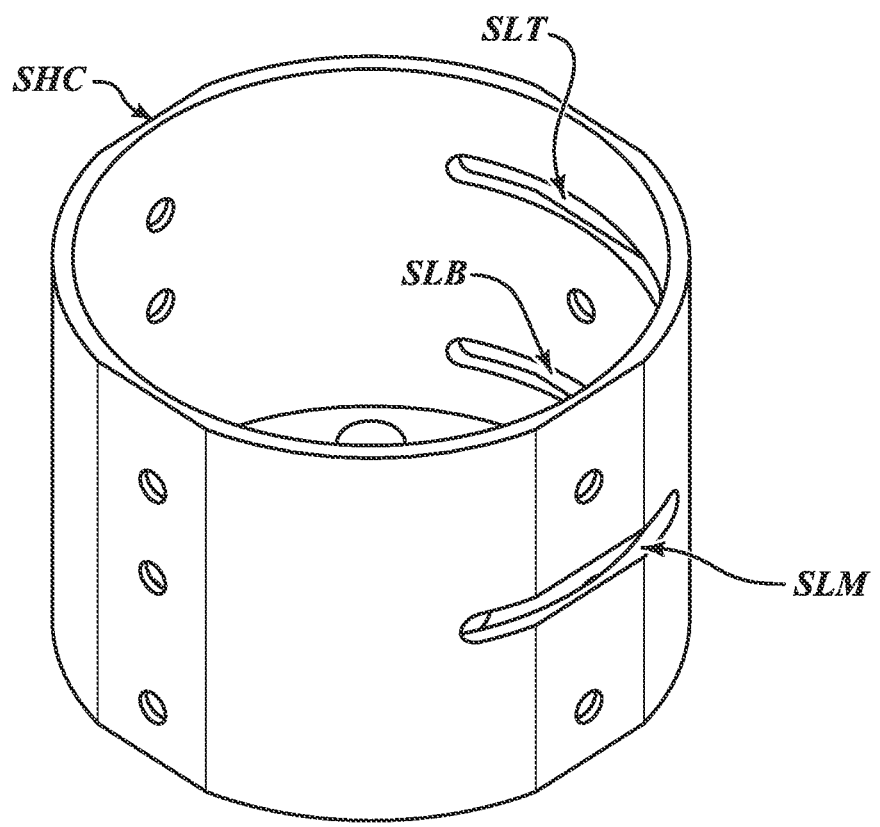
Figure 8C:
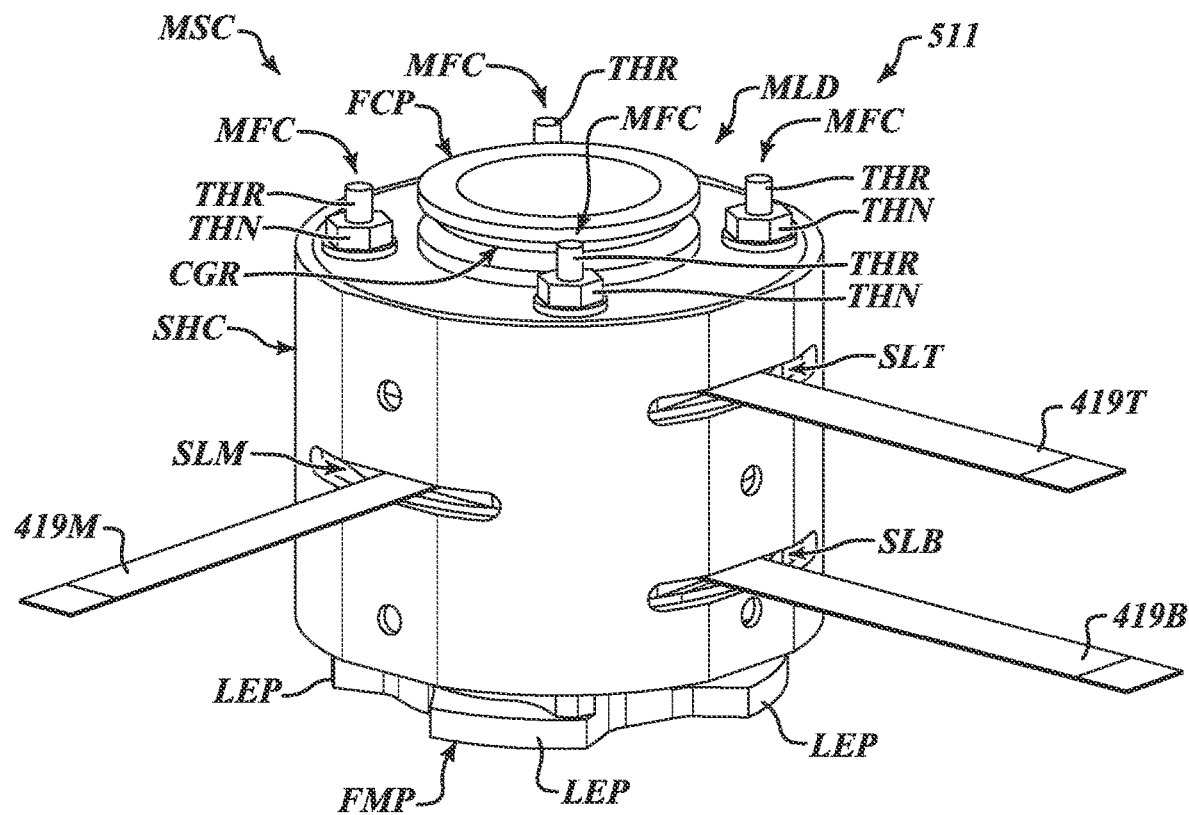

FIG. 8B illustrates one implementation of at least part of the shield configuration SHC. In various implementations, the shield configuration SHC comprises electrically conductive material (e.g., aluminum, or stainless steel, etc.). FIG. 8C illustrates an implementation of the assembled stylus position detection module 511, showing the shield configuration SHC as surrounding the sensor configuration SNC (see FIG. 8A). In various implementations, the module lid portion MLD may be included as part of the shield configuration SHC, or may be a separate element.

In various implementations, the shield configuration SHC provides a defined, stable boundary for the electromagnetic field generated by the sensor configuration SNC (e.g., in accordance with the changing magnetic flux/electromagnetic field generated by the field generating coil configuration 560). The utilization of the shield configuration SHC thus reduces the risk of potential signal errors (e.g., corresponding to measurement signal errors) that might otherwise be caused by various factors (e.g., such as the operations and/or components of the stylus suspension module 407' and/or the signal processing and control circuitry module 480, or damage to the probe cover 403, etc.) The shield configuration SHC also enables the sensor configuration SNC to be mechanically isolated from the probe cover 403 and the CMM mounting (e.g., as occurring at the autojoint connection portion 401).

In various implementations, a minimum desired thickness for the electrically conductive material of the shield configuration SHC may be determined and utilized in accordance with a radio frequency penetration depth. For example, in one specific example implementation where a radio frequency penetration depth is approximately 20 um at a utilized operating frequency (e.g., for the field generating coil configuration 560), it may be desirable to utilize a shield configuration with at least that thickness or greater.

In various implementations, for any slots (e.g., for allowing electrical connectors to pass through) or breaks (e.g., for forming the shield configuration of more than one piece of material) included in the shield configuration SHC, it may be desirable for such elements have orientations primarily in directions perpendicular to the central axis CA/axial direction O (e.g., to be horizontally oriented). For example, slots or breaks in the shield configuration SHC that are oriented parallel to the central axis CA/axial direction O (e.g., vertical slots or breaks) may be more likely to reduce shield performance (e.g., in relation to the electromagnetic field produced by the field generating coil configuration 560). Thus, if the shield is to be formed from multiple pieces of material, it may be preferable to have a stacked configuration (e.g., stacked cylindrical portions or discs) with corresponding breaks that are perpendicular to the central axis CA/axial direction O.

As illustrated in FIGS. 8B and 8C, the shield configuration SHC includes a top horizontal slot SLT, a middle horizontal slot SLM, and a bottom horizontal slot SLB. The top horizontal slot SLT is configured to receive a top electrical connector 419T, which is configured to couple the coils of the top coil substrate 571T to the signal processing and control circuitry module 480. The middle horizontal slot SLM is configured to receive a middle electrical connector 419M, which is configured to couple the coil(s) of the field generating coil configuration 560 to the signal processing and control circuitry module 480. The bottom horizontal slot SLB is configured to receive a bottom electrical connector 419B, which is configured to couple the coils of the bottom coil substrate 571B to the signal processing and control circuitry module 480. It will be appreciated that the locations of the slots SL and corresponding electrical connectors 419 may indicate a desired angular orientation of the signal processing and control circuitry module 480 when it is coupled to the stylus position detection module 511 (e.g., so that the electrical connectors 419 will easily and directly extend from the stylus position detection module 511 up to the corresponding connection points on the signal processing and control circuitry module 480).

Figure 8D:
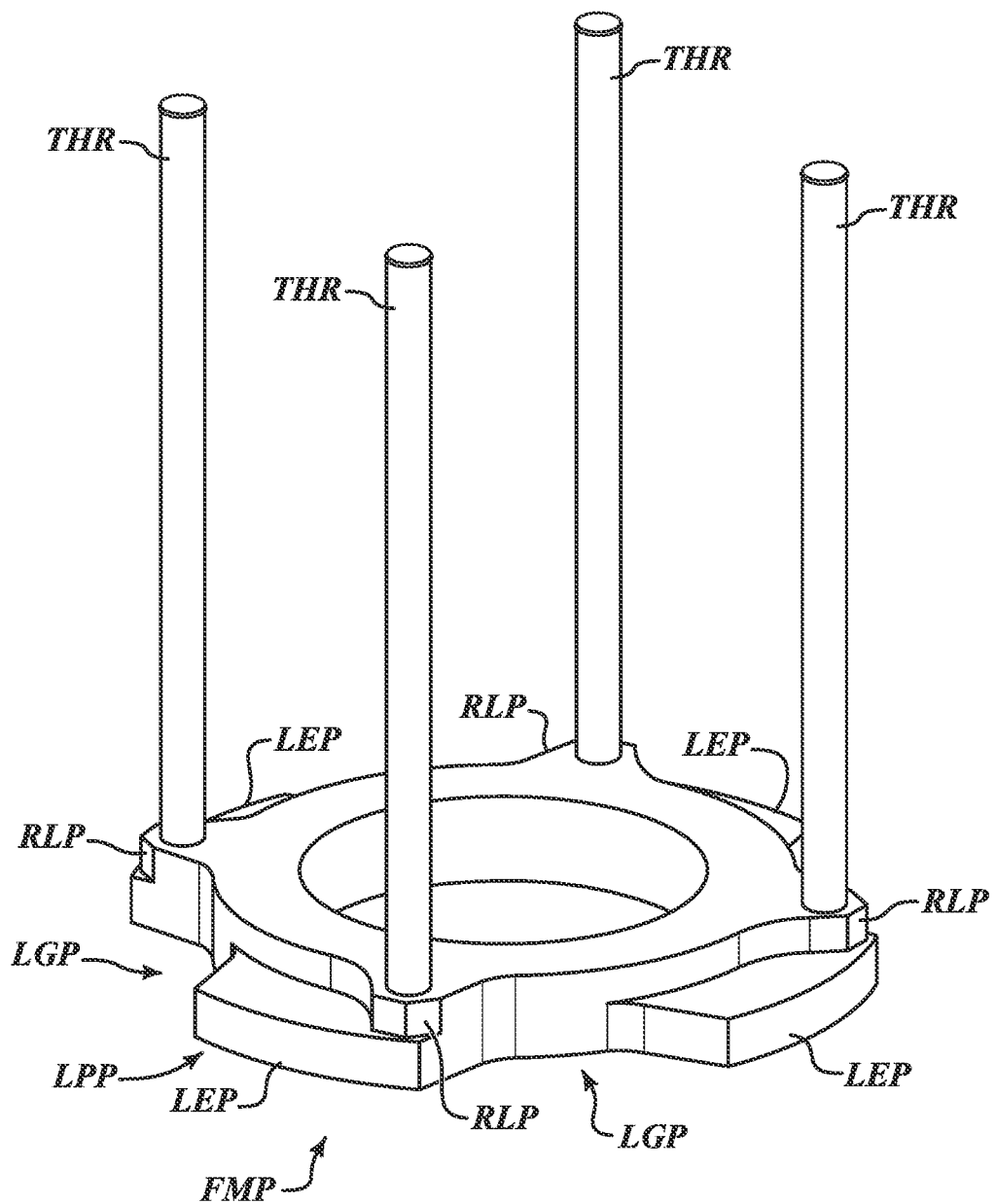

FIG. 8D illustrates an implementation of the first mounting portion FMP, which is at the bottom of the stylus position detection module 511. The first mounting portion FMP includes a lower plate portion LPP which includes lower extension portions LEP (e.g., including four lower extension portions LEP in the illustrated example), and for which the gaps/spacings between the lower extension portions LEP are referenced as lower gap portions LGP (e.g., including four lower gap portions LGP in the illustrated example). The first mounting portion FMP also includes rotation limiting portions RLP, which may limit the rotation/movement of the first mounting portion FMP relative to the second mounting portion SMP (i.e., in relation to rotation around the central axis CA), as will be described in more detail below. Threaded rods THR are rigidly attached to the first mounting portion FMP (e.g., approximately at the locations of the rotation limiting portions RLP in the illustrated example), and extend upward. As indicated by the illustration in FIG. 8C, when the stylus position detection module 511 is assembled, in various implementations the various components may have holes through which the threaded rods THR may slide, wherein for the assembly each component may be lowered down over the threaded rods THR in turn (e.g., including the substrates/components 571B, 561, 571T, as well as the various other alignment and mounting portions 417, as indicated in FIG. 8A).

In various implementations, the shield configuration SHC may be configured to enable the sensor configuration SNC to be adjusted in X and Y directions within (e.g., in order to achieve offset correction, etc.). As part of such adjustability, it is noted that as illustrated in FIG. 8D, the first mounting portion FMP may be rigidly attached to the threaded rods THR. The corresponding components of the sensor configuration SNC (e.g., including the substrates/components 571B, 561, 571T, as well as the various alignment and mounting portions 417 as located above and below as illustrated in FIGS. 4A and 8A) may each have corresponding holes for sliding down over the threaded rods THR during assembly of the sensor configuration SNC, and for which each of the components of the sensor configuration SNC may be maintained in relative alignment with each other. In various implementations, holes or other openings at the top and bottom of the shield configuration SHC (e.g., including in the module lid portion MLD) that the threaded rods THR extend through, may have sufficient diameter or area to enable the threaded rods THR to be moved in X and Y directions relative to the shield configuration SHC (e.g., before the threaded nuts THN are tightened down).

In accordance with such features, the sensor configuration SNC may be movable in X and Y directions within and relative to the shield configuration SHC, as part of an alignment process (e.g., for achieving a desired locating/centering of the disruptor element 551 relative to the sensor configuration SNC, for which the disruptor element 551 is coupled to the stylus suspension module 407'). In various implementations, in order to adjust the position of the sensor configuration SNC in X and Y directions, the sensor configuration SNC may be pushed or otherwise maneuvered utilizing dowel pins or other mechanisms, with access through corresponding holes in the sides of the shield configuration SHC (e.g., as illustrated in FIGS. 8B and 8C), and for which the first mounting portion FMP as attached at the bottom of the threaded rods THR may correspondingly be moved in X and Y directions relative to the second mounting portion SMP, as part of the operations of the module mounting configuration MMC.

Once the desired alignment in the X and Y directions is achieved, the threaded nuts THN may be tightened down as part of a module securing configuration MSC, to rigidly secure the alignment and the mounting of the stylus position detection module 511 to the stylus suspension module 407'. It will be appreciated that the tightening down of the threaded nuts THN compresses down the module lid portion MLD and compresses and secures all of the components of the sensor configuration SNC in a fixed and stable relationship. In various implementations, the module lid portion MLD may be included as part of the shield configuration SHC, or may be designated as a separate element.

In various implementations, the module securing configuration MSC includes one or more mechanical fastening configurations MFC that are utilized to rigidly secure the first mounting portion FPM to the second mounting portion SMP and for which an adhesive is not utilized for rigidly securing the stylus position detection module 511 (including the sensor configuration SNC) to the stylus suspension module 407. In the example configuration as illustrated in FIGS. 8C and 8D, the module securing configuration MSC includes four mechanical fastening configurations MFC, each including a threaded rod THR which is rigidly attached to the first mounting portion FMP, and a threaded nut THN (e.g., which may be rotated to tighten down on the corresponding threaded rod THR).

Figure 9:
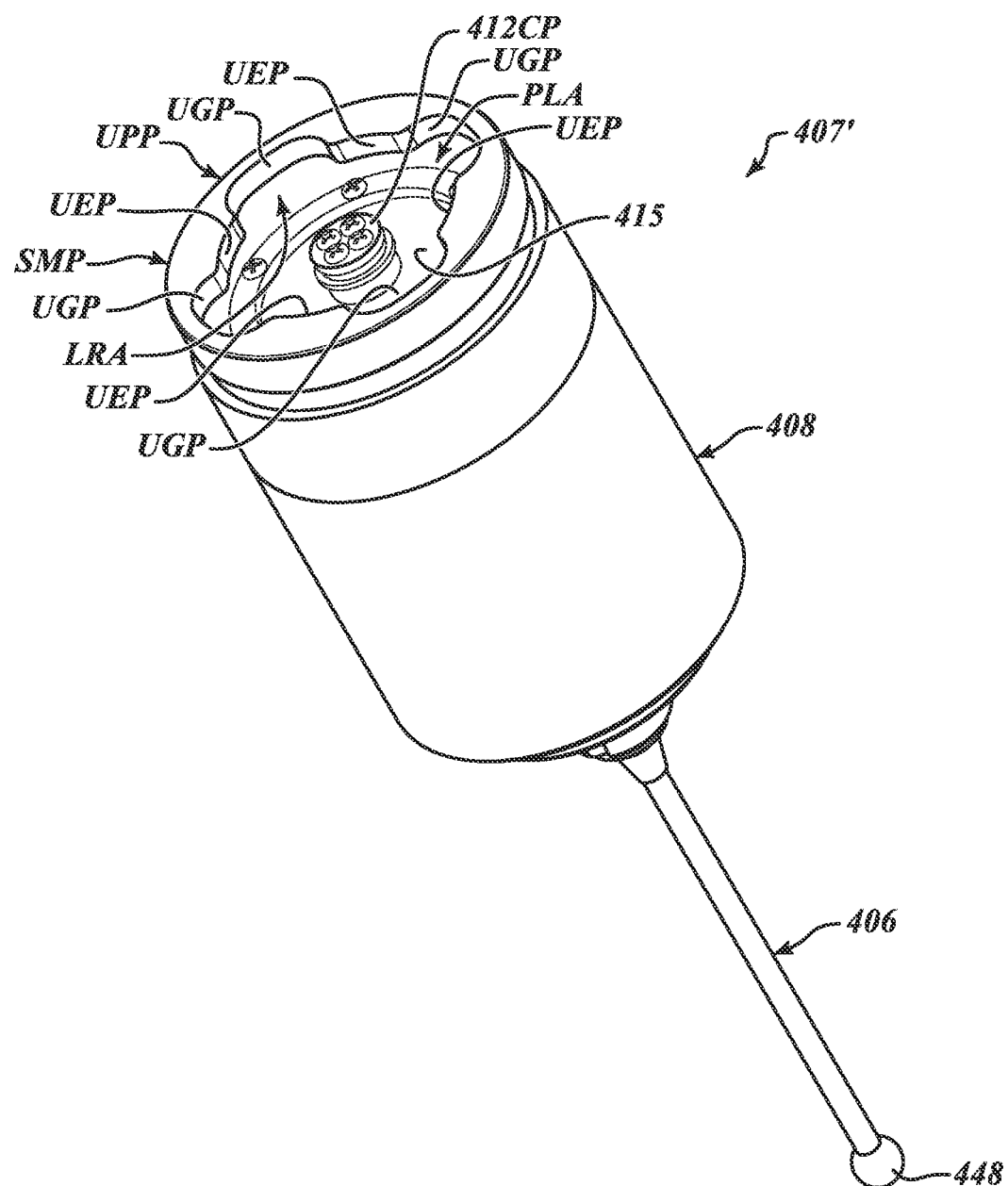
FIG. 9 is a diagram showing an implementation of the stylus suspension module of FIG. 4A.

FIG. 9 is a diagram showing an implementation of the stylus suspension module 407' of FIG. 4A. As shown in FIG. 9, the stylus 406 with the probe tip 448 is attached at the bottom of the stylus suspension module 407'. The second mounting portion SMP (i.e., which engages with the first mounting portion FMP of FIG. 8D) is shown at the top of the stylus suspension module 407'. The second mounting portion SMP includes an upper plate portion UPP, which includes upper extension portions UEP (e.g., including four upper extension portions UEP in the illustrated example), and for which the gaps/spacings between the upper extension portions are referenced as upper gap portions UGP (e.g., including four upper gap portions UGP in the illustrated example). It will be appreciated that the lower plate portion LPP (e.g., see FIG. 8D) of the stylus position detection module 511 is shaped to fit down through a plate aperture PLA in the upper plate portion UPP of the stylus suspension module 407'. The shape of the outer boundary of the plate aperture PLA is formed by the upper extension portions UEP and the upper gap portions UGP. The lower plate portion LPP will fit through/be received through the plate aperture PLA when in an angular orientation (e.g., in accordance with rotation around the central axis CA) wherein the lower extension portions LEP are aligned with the upper gap portions UGP.

In various implementations, as part of the assembly of the scanning probe (e.g., for the mounting of the stylus position detection module 511 to the stylus suspension module 407'), the approximate desired alignment (e.g., angular orientation) between the stylus position detection module 511 and the stylus suspension module 407' may be determined. After the stylus position detection module 511 is positioned proximate to the stylus suspension module 407' in approximately the desired alignment, the stylus position detection module 511 may be rotated (e.g., about the central axis, such as potentially counter-clockwise in the illustrated example) or otherwise maneuvered (e.g., so that the lower extension portions LEP align with the upper gap portions UGP) so that the lower plate portion LPP may be lowered through the plate aperture PLA.

As will be described in more detail below with respect to FIG. 10, when the lower plate portion LPP is down in the lower receiving area LRA, the stylus position detection module 511 may be rotated (e.g., about the central axis, such as potentially clockwise in the illustrated example) so that the lower extension portions LEP are rotated to be at least partially under the upper extension portions UEP (e.g., to return to the approximate desired angular alignment between the stylus position detection module 511 and the stylus suspension module 407'). It is noted that the rotation limiting portions RLP (and/or the threaded rods THR) may limit the clockwise rotation past a certain point (i.e., at which the rotation limiting portions RLP and/or threaded rods THR may contact the edges of the upper extension portions UEP and thus prevent further rotation, as can be visualized in regard to the illustration of FIG. 10 which will be described in more detail below). The potential limits to the rotation indicate why it may be desirable to initially position the stylus position detection module 511 proximate to the stylus suspension module 407' in approximately the desired alignment. More specifically, after the counter-clockwise rotation is performed to enable the lower plate portion LPP to be lowered through the plate aperture PLA, after the lower plate portion LPP has been lowered, due to the rotation limiting portions RLP or other factors, there may only be a limited amount of subsequent clockwise rotation that can be performed for achieving the desired alignment (e.g., for "clocking" the stylus position detection module 511 to the stylus suspension module 407' and/or for otherwise achieving the desired angular alignments of the modules of the scanning probe 400, for which the autojoint connection portion 401 may also subsequently be clocked to the stylus suspension module 407', etc.).

Figure 10:
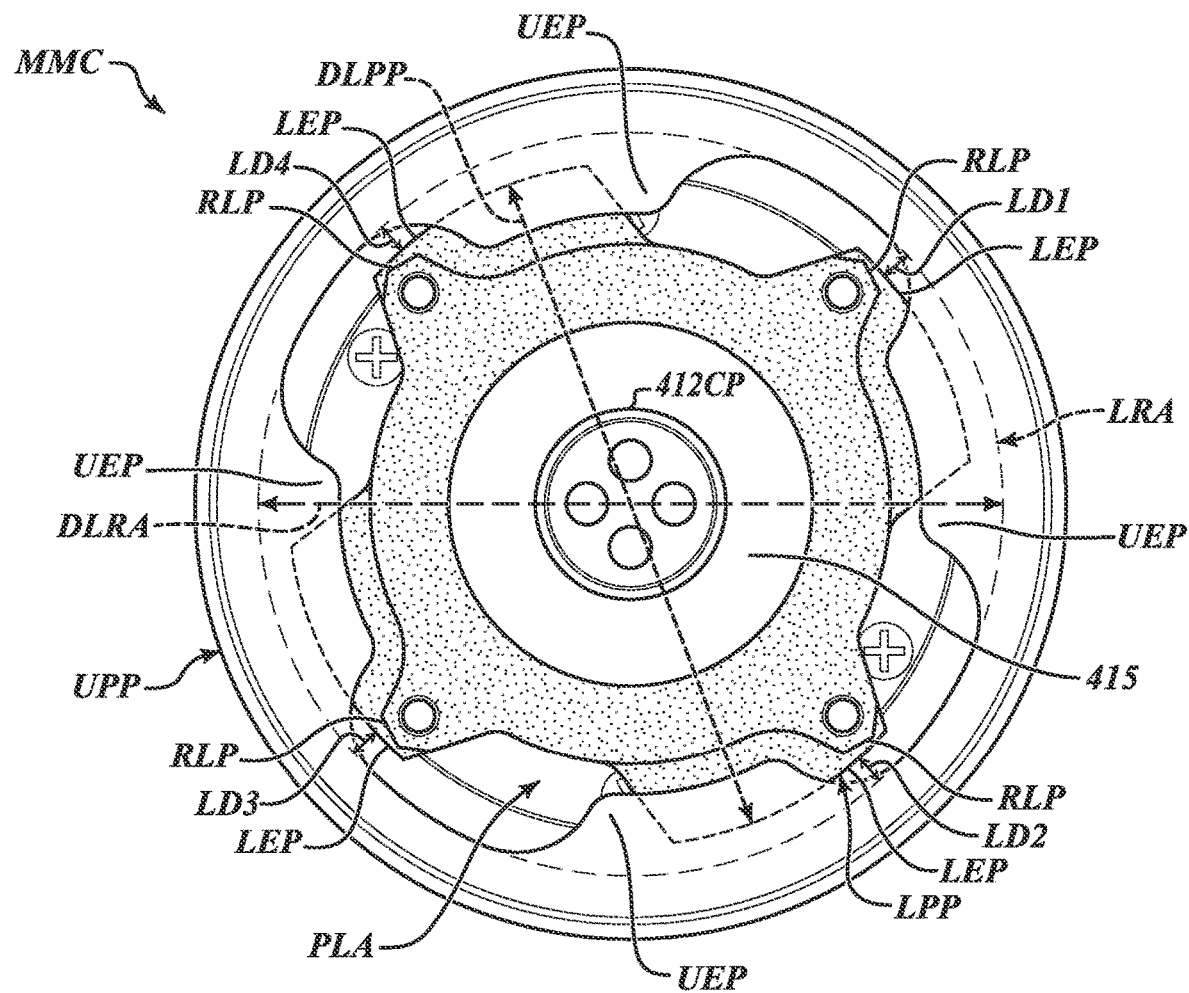
FIG. 10 is a diagram showing an implementation of a module mounting configuration for mounting the stylus position detection module of FIGS. 8A-8D to the stylus suspension module of FIG. 9.

FIG. 10 is a diagram showing an implementation of the module mounting configuration MMC for mounting the stylus position detection module 511 of FIGS. 8A-8D to the stylus suspension module 407' of FIG. 9. In the example of FIG. 10, the first mounting portion FMP has been engaged with the second mounting portion SMP according to the process as described above with respect to FIG. 9, and with the lower extension portions LEP at least partially under the upper extension portions UEP (e.g., with at least approximately the desired angular alignment between the stylus position detection module 511 and the stylus suspension module 407'). When in such a position, the sensor configuration SNC of the stylus position detection module 511 that is rigidly coupled to the first mounting portion FMP (i.e., by the threaded rods THR) may be adjusted in X and Y directions relative to the stylus suspension module 407' to achieve a desired alignment with the stylus suspension module 407' (e.g., in accordance with the ability of the lower plate portion LPP to be adjusted in X and Y directions when within the lower receiving area LRA).

As indicated in FIG. 10, in the lower receiving area LRA, the lower plate portion LPP may rotate and has sufficient spacing to enable the lower plate portion LPP to be moved laterally in the X and Y directions. In the illustrated implementation, the lower receiving area LRA is circular, and has a diameter DLRA which is larger than a dimension DLPP across the lower plate portion LPP (e.g., a largest dimension across from outer edge to outer edge of two oppositely located lower extension portions LEP and/or equivalent to a diameter across a circle defined by the outer edges of the lower extension portions of the lower plate portion LPP). As a result of the dimension DLRA being larger than the dimension DLPP, the lower plate portion LPP has room to be moved laterally within the lower receiving area LRA. In the illustrated example, the four lower extension portions LEP are at respective distances LD1-LD4 from the closest edges of the available movement area (e.g., as may correspond to the edges of the lower receiving area LRA or for which other aspects may limit the available movement area), for which those distances each correspond to a dimension over which the first mounting portion FMP could be laterally moved (i.e., in the X and Y directions) toward the nearest edge of the available movement area. In one implementation, in an instance where the lower plate portion LPP is exactly centered in the lower receiving area LRA, the dimensions LD1-LD4 may all be approximately equal.

Once any movements in the X and Y directions have been completed and the desired alignment has been achieved, the mechanical fastening configurations MFC of the module securing configuration MSC (e.g., as illustrated in FIG. 8C) may be utilized to compress and rigidly secure the configuration, with the lower extension portions LEP compressed up against the upper extension portions UEP for preventing further movement of the lower extension portions LEP relative to the upper extension portions UEP and correspondingly preventing further movement of the stylus position detection module 511 including the sensor configuration SNC relative to the stylus suspension module 407'. In various implementations, the module mounting configuration MMC may avoid the need for utilizing adhesives or other permanent fastening techniques for securing the stylus position detection module 511 (i.e., including the sensor configuration SNC) to the stylus suspension module 407'. It will be appreciated that the mechanical fastening configurations MFC may also enable relatively simple unmounting of the stylus position detection module 511 from the stylus suspension module 407' (e.g., by unscrewing the threaded nuts THN), as may be desirable in certain instances (e.g., for replacing and/or inspecting parts that may wear out or become damaged with repeated use or due to impacts or otherwise over time, etc.).

Figure 11:
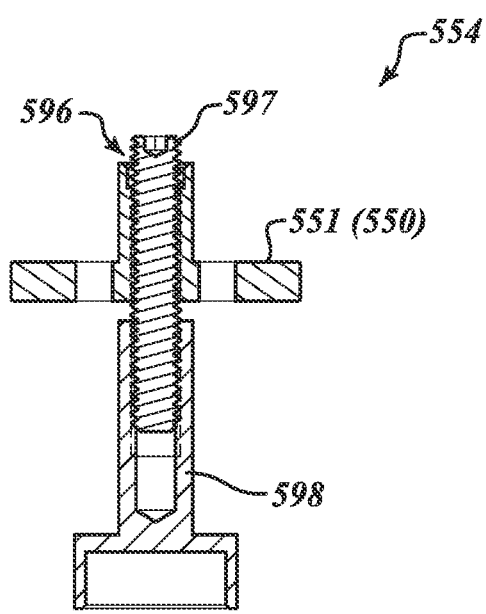
FIG. 11 is a diagram showing an implementation of a disruptor assembly as utilized in the implementation of FIG. 4A in conjunction with the signal processing and control circuitry module.

FIG. 11 is a diagram showing an implementation of a disruptor assembly 554 as utilized in the implementation of FIG. 4A in conjunction with the stylus position detection module 511. As indicated in FIGS. 4B and 11, the disruptor assembly 554 comprises the disruptor configuration 550 (including the disruptor element 551), a pocket element 596, an adjustment component 597 (e.g., a set screw), and a spindle 598. In various implementations, the adjustment component 597 may be rigidly attached to the spindle 598 (e.g., by tightening and without utilizing an adhesive). For the coupling of the disruptor configuration 550 to the stylus suspension module 407', as per the disruptor coupling configuration 553, the spindle 598 is rigidly attached to the upper portion 412C of the moving member 412 of the stylus suspension module 407'. In various implementations, the attachment may be performed while the disruptor assembly 554 is inside of the sensor configuration SNC (e.g., for which the disruptor assembly 554 may have been placed inside the sensor configuration SNC during the assembly of the sensor configuration SNC). For accessing the disruptor assembly 554 inside of the sensor configuration for performing the attachment to the upper portion 412C of the moving member 412 of the stylus suspension module 407', the substrate 571T may include a top hole 591T which provides the access, and which also provides access to the disruptor element 551 and adjustment component 597 for making adjustments.

In various implementations (e.g., as illustrated in FIGS. 4A and 4B), the upper portion 412C may include or have a designated upper coupling portion 412CP (e.g., either as part of or rigidly attached to the upper portion 412C), which the spindle 598 rigidly couples to. The adjustment component 597 is configured to enable a location of the disruptor element 551 to be adjusted along the axial direction O (e.g., by rotating the disruptor element 551 around the threaded adjustment component 597 to move the disruptor element 551 up or down) to achieve a desired alignment in the axial direction within the stylus position detection module 511 (e.g., to be aligned within the magnetic field produced by the field generating coil 561) after the stylus position detection module is mounted to the stylus suspension module 407'. After the desired alignment along the axial direction is achieved, the disruptor element 551 may be rigidly attached to the adjustment component 597 (e.g., utilizing an adhesive as inserted into the pocket element 596). As noted above, the top hole 591T in the substrate 571T provides the access for adjusting the position of the disruptor element 551 and for applying the adhesive to the pocket element 596.

The following is a description of various assembly processes, including for the individual modules, as well as for the overall scanning probe 400. In various implementations, the assembly of the stylus position detection module 511 (e.g., as illustrated in FIGS. 8A-8D) may include the attachment of the threaded rods THR to the first mounting portion FMP. The shield configuration SHC may include holes in the bottom (e.g., which are larger than the diameters of the threaded rods THR so as to enable position adjustments in the X and Y directions to be performed) which enable the shield configuration SHC to be lowered down with the threaded rods THR passing through the holes until the bottom of the shield configuration SHC rests on the first mounting portion FMP. Each of the components of the sensor configuration SNC (e.g., including the substrates/components 571B, 561, 571T, as well as the various alignment and mounting portions 417 located above and below as illustrated in FIGS. 4A and 8A) may each be lowered down in turn, with the threaded rods THR passing through respective holes in each of the components as they are lowered. Before the substrate 571T is lowered down, the disruptor assembly 554 may be lowered into the open middle area of the components, after which the substrate 571T may be lowered down (e.g., for which the central holes 591B and 591T in the substrates 571B and 571T may be smaller than the disruptor element 551, thus preventing the disruptor assembly 554 from being removed from the sensor configuration SNC while the substrates 571B and 571T are in place). Each of the electrical connectors 419B, 419M and 419T may be connected through the respective slots SLB, SLM and SLT, to the respective substrates/components 571B, 561, 571T as they are each lowered to their respective positions in turn. After the respective components of the sensor configuration SNC are in place, the module lid portion MLD may be placed on top. In various implementations, the module lid portion MLD may be included as part of the shield configuration SHC. Similar to the bottom of the shield configuration SHC, the module lid portion MLD may include relatively larger holes in the top (e.g., which are larger than the diameters of the threaded rods THR so as to allow position adjustments in the X and Y directions) which enable the module lid portion MLD to be lowered down with the threaded rods THR passing through the holes to allow the module lid portion MLD to rest at the top of the shield configuration SHC. At this point of the assembly process, in some implementations the threaded nuts THN (e.g., along with corresponding washers) may be loosely installed on the threaded rods THR, but may not yet be tightened (e.g., so as to enable operations of the module mounting configuration MMC for the coupling to the stylus suspension module 407', and including enabling adjustments of the sensor configuration SNC in X and Y directions).

In various implementations, the signal processing and control circuitry module 480 may be assembled next, in parallel, or before, and may include installing printed circuit boards as indicated by the configuration of FIG. 7. The stylus suspension module 407' may similarly be assembled next, in parallel, or before with respect to the assembling of the other modules.

For the assembly of the scanning probe 400, in various implementations the stylus position detection module 511 may be mounted to the stylus suspension module 407'. In various implementations, the stylus suspension module 407' may be placed in a holder, and the stylus position detection module 511 may be positioned in approximate alignment (e.g., in approximate rotational alignment) with the stylus suspension module 407' and lowered down to be on top of the stylus suspension module 407'. In accordance with the operation of the module mounting configuration MMC, the stylus position detection module 511 may then be rotated (e.g., counter-clockwise) until the lower extension portions LEP of the first mounting portion FMP are aligned with the upper gap portions UGP and drop down into the lower receiving area LRA of the second mounting portion SMP. In various implementations, it may be required that the threaded nuts THN have not yet been tightened in order for the lower extension portions LEP to drop down far enough to continue the process. After the lower extension portions LEP have dropped down, the stylus position detection module 511 may be rotated (e.g., clockwise) to return to the approximate desired alignment with the stylus suspension module 407'. It is noted this rotation will correspondingly cause the lower extension portions LEP to slide under the upper extension portions UEP of the second mounting portion SMP.

In various implementations, the disruptor assembly 554 (e.g., as previously placed in the sensor configuration SNC during assembly) may then be coupled to the upper portion 412C of the moving member 412 of the stylus suspension module 407' (e.g., as extending up toward the sensor configuration SNC as part of the mounting of the stylus position detection module 511 to the stylus suspension module 407'). The adjustment component 597 may then be utilized to adjust the Z alignment (i.e., in the axial direction) of the disruptor element 551 (e.g., for aligning in the axial direction, such as relative to the field generating coil configuration 560). After the desired alignment along the axial direction is achieved, the disruptor element 551 may be rigidly attached to the adjustment component 597 (e.g., utilizing an adhesive as inserted into the pocket element 596). As noted above, the top hole 591T in the substrate 571T provides the access for adjusting the position of the disruptor element 551 and for applying the adhesive to the pocket element 596, while the disruptor assembly 554 is within the sensor configuration SNC.

In various implementations, in accordance with the operations of the module mounting configuration MMC, the relative position of the sensor configuration SNC may then be adjusted in X and Y directions (e.g., for achieving a desired locating/centering of the disruptor element 551 relative to the sensor configuration SNC). In various implementations, in order to adjust the position of the sensor configuration SNC in X and Y directions, the sensor configuration SNC may be pushed or otherwise maneuvered (e.g., utilizing dowel pins or other mechanisms, such as with access through corresponding holes in the sides of the shield configuration SHC, such as illustrated in FIGS. 8B and 8C). Correspondingly, the first mounting portion FMP as attached at the bottom of the threaded rods THR may be moved in X and Y directions relative to the second mounting portion SMP, as part of the operations of the module mounting configuration MMC. Once the desired alignment in the X and Y directions is achieved, the threaded nuts THN may be tightened down as part of the module securing configuration MSC, to rigidly secure the alignment and the mounting of the stylus position detection module 511 to the stylus suspension module 407'.

After the module mounting configuration MMC has been secured, in various implementations the signal processing and control circuitry module 480 may be coupled to the stylus position detection module 511 (e.g., utilizing the module coupling configuration MCC). More specifically, the securing components SEC (set screws) of the second coupling portion SCP may be rotated into the receiving portion CGR (e.g., a circular groove) of the first coupling portion, for rigidly coupling the signal processing and control circuitry module 480 to the stylus position detection module 511. As part of the coupling process, the signal processing and control circuitry module 480 may first be rotated to be angularly aligned so that the connectors 419B, 419M and 419T from the respective substrates/components 571B, 561, 571T are able to extend up to be connected to the corresponding attachment locations on the signal processing and control circuitry module 480 (e.g., as illustrated in FIG. 4A).

In various implementations, the probe cover 403 may next be lowered over the signal processing and control circuitry module 480 and the stylus position detection module 511, and for which a lower part of the probe cover 403 may be configured to be rigidly attached to the stylus suspension module 407'. For example, the lower part of the probe cover 403 may be threaded, or otherwise configured to be twisted down onto a corresponding receiving part of the stylus suspension module 407'.

After the probe cover 403 is attached, in various implementations, the autojoint connection portion 401 (e.g., as illustrated in FIG. 4A) may then be installed/attached. For the installation, the autojoint connection portion 401 may be angularly adjusted (e.g., with rotational adjustment around the central axis CA) relative to the stylus suspension module 407' (and other modules of the scanning probe 400) in order to be at a preferred angular orientation and corresponding alignment. Such processes may also be described as "clocking" the autojoint connection portion 401 to one or more of the modules (e.g., the stylus suspension module 407'). The circular attachment portion 401AT may be utilized to attach the autojoint connection portion 401 to the rest of the scanning probe 400 (e.g., to attach to a top part of the probe cover 403 utilizing an adhesive). The bottom part of the circular attachment portion 401AT may be rotatable within the top part of the probe cover 403 before the adhesive sets. Such a configuration enables the autojoint connection portion 401 to be clocked or otherwise angularly adjusted relative to the stylus suspension module 407' and/or other modules in order to achieve the desired angular orientation and corresponding alignment as described above, after which the adhesive is allowed to set for maintaining the orientation.

It will be appreciated that the principles described above with respect to FIGS. 3-11 may be utilized with other configurations of stylus position detection modules. As some specific examples, such principles may be utilized with the configurations disclosed in the previously incorporated U.S. Patent Publication No. 2020/0141717, as well as with the configurations disclosed in co-pending and commonly assigned U.S. patent application Ser. No. 17/135,665, entitled "Inductive Position Detection Configuration for Indicating a Measurement Device Stylus Position", as filed on Dec. 28, 2020, and in co-pending and commonly assigned U.S. patent application Ser. No. 17/135,672, entitled "Inductive Position Detection Configuration for Indicating a Measurement Device Stylus Position and Including Coil Misalignment Compensation", as filed on Dec. 28, 2020, each of which is hereby incorporated herein by reference in its entirety. It will be appreciated that these incorporated references illustrate certain configurations with variations in the locations, sizes and/or shapes of the sensing coils, field generating coils, disruptor element(s), etc., (e.g., with a single printed circuit board including all of the coils of the coil board configuration, and/or with a cylindrical disruptor element configured to move and fit within the middle hole 591M of the coil board configuration, etc.), but for which the coils and/or associated operations are otherwise similar to those of the stylus position detection modules 411, 511, 511' described herein, and for which the configurations may similarly be utilized/implemented with and/or as part of the modules and configurations as disclosed herein.

FIG. 12 is a flow diagram showing one example of a method for assembling a modular configuration of a scanning probe 300/400. The method includes generally two steps (blocks).

In block 1202, the first step includes mounting a stylus position detection module 511 to a stylus suspension module 407' (e.g., utilizing a module mounting configuration MMC), The stylus suspension module 407' comprises a stylus coupling portion 342 that is configured to be rigidly coupled to a stylus 306 with a probe tip 348, and a stylus motion mechanism 309 that enables axial motion of the stylus coupling portion 342 along an axial direction and rotary motion of the stylus coupling portion 342 about a rotation center, and the stylus position detection module 511 is assembled separately from the stylus suspension module 407' before mounting to the stylus suspension module 407', and when mounted the stylus position detection module 511 is arranged along a central axis that is parallel to the axial direction and nominally aligned with the rotation center, and the stylus position detection module 511 comprises a sensor configuration SNC comprising: a field generating coil configuration 460 comprising at least one field generating coil 461; a top axial sensing coil configuration TASCC comprising at least one top axial sensing coil; a bottom axial sensing coil configuration BASCC comprising at least one bottom axial sensing coil; and a plurality of top rotary sensing coils TRSC and a plurality of bottom rotary sensing coils BRSC.

In block 1204, the second step includes rigidly coupling a signal processing and control circuitry module 480 to the stylus position detection module 511 (e.g., utilizing a module coupling configuration MCC). The signal processing and control circuitry module 480 is assembled separately from the stylus position detection module 511 and the stylus suspension module 407' before rigidly coupling to the stylus position detection module 511, wherein the signal processing and control circuitry module 480 is operably connected to the coils of the stylus position detection module 511 to provide a coil drive signal to the at least one field generating coil 461 and to input signals comprising respective signal components provided by respective rotary and axial sensing coils of the stylus position detection module 511, and to output signals indicative of an axial position and a rotary position of the probe tip 348.

Figure 13:
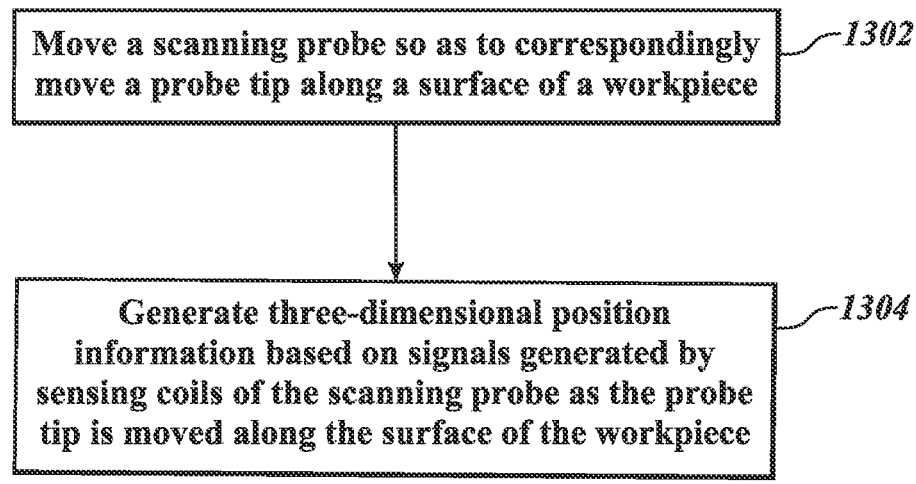
FIG. 13 is a flow diagram showing one example of a method for utilizing a scanning probe for measuring a surface of a workpiece.

FIG. 13 is a flow diagram showing one example of a method for utilizing a scanning probe 300/400 for measuring a surface of a workpiece. The method includes generally two steps (blocks).

In block 1302, the first step includes moving a scanning probe 300/400 so as to correspondingly move a probe tip 348 along a surface of a workpiece W.

In block 1304, the second step includes generating three dimensional position information based on signals generated by sensing coils of the scanning probe 300/400 as the probe tip 348 is moved along the surface of the workpiece In general, it will be appreciated that the references herein to top and bottom components, or upper and lower components, are intended to be in reference to a scanning probe in an orientation such as that illustrated in FIGS. 1 and 4A (e.g., with the central axis CA in a vertical orientation and with the probe tip 448 at the bottom and the autojoint connection portion 401 at the top). In various implementations, the autojoint connection portion 401 may be referenced as or near a proximal end of the scanning probe 400, and the stylus coupling portion 442 and/or the probe tip 448 may be referenced as or near a distal end of the scanning probe 200. As utilized herein, the relative terms "top" and "bottom" are in relation to top components that are closer to the proximal end of the scanning probe than corresponding bottom components that are closer to the distal end of the scanning probe. Similarly, the relative terms "upper" and "lower" are in relation to upper components that are closer to the proximal end of the scanning probe than corresponding lower components that are closer to the distal end of the scanning probe.

It will be appreciated that there are various advantages to the configurations as disclosed herein. For example, the stylus suspension module 407', stylus position detection module 511 and signal processing and control circuitry module 480 may each be assembled separately, then attached for the assembling of the scanning probe 400. These features enable effective and parallel assembly and testing to be performed for each of the individual modules, before the scanning probe 400 is assembled. The assembled scanning probe may also be relatively easy to disassemble by removing one or more of the individual modules (e.g., enabling the replacement of worn or faulty parts, etc.).

As noted above, in various implementations the probe cover 403 is not in contact with the stylus position detection module 511 or the signal processing and control circuitry module 480. The stylus position detection module 511 is mounted to the stylus suspension module 407' utilizing the module mounting configuration MMC. The signal processing and control circuitry module 480 is rigidly coupled to the stylus position detection module 511 utilizing the module coupling configuration MCC. The stylus suspension module 407' is rigidly coupled to the autojoint connection portion 401 by the probe cover 403 (i.e., for which the stylus suspension module 407' is rigidly coupled to a bottom part of the probe cover 403, and a top part of the probe cover 403 is rigidly coupled to the autojoint connection portion 401). The probe cover 403 thus goes around but is not in contact with or otherwise rigidly coupled directly to the stylus position detection module 511 and the signal processing and control circuitry module 480. The isolation from the probe cover 403 helps protect the stylus position detection module 511 and the signal processing and control circuitry module 480 from impacts or other incidents related to the probe cover (e.g., due to rough handling, incidents during shipping, impacts during use, etc.).

As part of the module mounting configuration MMC, the stylus position detection module 511 includes the first mounting portion FMP and the stylus suspension module 407' includes the second mounting portion SMP. The first mounting portion FMP includes lower extension portions LEP (e.g., which in some instances may be referenced as a type of "petals") which drop into upper gap portions UGP (e.g., which in some instances may be referenced as a type of "cutouts") in the second mounting portion SMP. The lower extension portions LEP may then slide under upper extension portions UEP of the second mounting portion (e.g., which in some instances may be referenced as an "overhang" portion of the second mounting portion). The module mounting configuration MMC (e.g., which in some instances be referenced as a type of clamping configuration) holds the stylus position detection module 511 onto the stylus suspension module 407'. As described herein, the module mounting configuration MMC enables at least part of the stylus position detection module 511 (e.g., including the sensor configuration SNC) to be adjusted in X and Y directions to be aligned with the stylus suspension module 407' (e.g., in alignment with the disruptor element 551 as coupled to the stylus suspension module 407'). In various implementations, the module mounting configuration MMC may enable relatively simple installation (e.g., enabling the stylus position detection module 511 to be installed blindly onto the stylus suspension module 407'), as may be desirable for various applications. In various implementations, the module mounting configuration MMC enables the mounting without utilizing an adhesive, so that the stylus position detection module 511 and the stylus suspension module 407' may be unmounted/separated relatively quickly and easily (e.g., allowing a scanning probe 400 to be refurbished and/or for a defective or worn stylus position detection module 511 to be easily replaced, etc.) and which avoids issues that might otherwise occur in relation to utilizing an adhesive (e.g., such as an adhesive expanding and potentially affecting an alignment or other aspect of the modules and/or components, etc.).

It will be appreciated that utilization of the module mounting configuration MMC enables the stylus position detection module 511 to be mounted to the stylus suspension module 407', for which the stylus position detection module 511 is not directly rigidly attached to the probe cover 403, and is thus mechanically isolated from the probe cover 403. The module mounting configuration MMC further enables the adjustment and alignment of at least part of the stylus position detection module 511 (e.g., including at least the sensor configuration SNC which may be adjusted in X and Y directions to achieve an alignment, such as in relation to the disruptor element 551 as coupled to the stylus suspension module 407', etc.).

It will be appreciated that the components of the sensor configuration SNC (e.g., including the substrates/components 571B, 561, 571T, as well as the various alignment and mounting portions 417 located above and below as illustrated in FIGS. 4A and 8A) form a compressed and stable configuration (e.g., in particular when utilizing the module mounting configuration MMC and as secured by the module securing configuration MSC) and effectively function to perform operations as a 3 dimensional inductive sensor.

In various implementations, at least some of the components of the sensor configuration SNC (e.g., including the substrates/components 571B, 561, 571T, as well as the various alignment and mounting portions 417 located above and below as illustrated in FIGS. 4A and 8A) may be conformally coated or constructed from thermally stable materials to prevent environmental drift.

The following describes various exemplary embodiments of the present disclosure with various features and elements annotated with reference numerals found in FIGS. 1-13. It should be understood that the reference numerals are added to indicate exemplary embodiments, and the features and elements are not limited to the particular embodiments illustrated in FIGS. 1-13.

According to one aspect, a modular configuration MCF for a scanning probe 400 for a coordinate measuring machine 200 is provided. The modular configuration MCF for the scanning probe includes a stylus suspension module 407', comprising: a stylus coupling portion 442 that is configured to be rigidly coupled to a stylus 406 with a probe tip 448; and a stylus motion mechanism 409 that enables axial motion of the stylus coupling portion 442 along an axial direction O, and rotary motion of the stylus coupling portion 442 about a rotation center RC.

The modular configuration MCF for the scanning probe further includes a stylus position detection module 511 configured to be assembled separately from the stylus suspension module 407' before mounting to the stylus suspension module as part of assembling the scanning probe 400. When mounted the stylus position detection module 511 is configured to be arranged along a central axis CA that is parallel to the axial direction O and nominally aligned with the rotation center RC. The stylus position detection module 511 includes a sensor configuration SNC comprising: a field generating coil configuration 560 comprising at least one field generating coil 561; a top axial sensing coil configuration TASCC comprising at least one top axial sensing coil; a bottom axial sensing coil configuration BASCC comprising at least one bottom axial sensing coil; and a plurality of top rotary sensing coils TRSC and a plurality of bottom rotary sensing coils BRSC.

A disruptor configuration 550 of the scanning probe is configured to be coupled to the stylus suspension module 407'. The disruptor configuration 550 comprises a conductive disruptor element 551 that provides a disruptor area, wherein the disruptor element 551 is configured to be located along the central axis CA in a disruptor motion volume MV and to be coupled to the stylus suspension module 407' by a disruptor coupling configuration 553, and to move in the disruptor motion volume MV relative to an undeflected position UNDF in response to a deflection of the stylus suspension module 407', for which the disruptor element 551 moves over operating motion ranges+/−Rz along the axial direction θ in response to the axial motion, and over respective operating motion ranges+/−Rx and +/−Ry along orthogonal X and Y directions that are orthogonal to the axial direction θ in response to the rotary motion. The field generating coil configuration 560 is configured to generate a changing magnetic flux generally along the axial direction θ in the disruptor motion volume MV in response to a coil drive signal.

The modular configuration MCF for the scanning probe further includes a signal processing and control circuitry module 480 that is configured to be assembled separately from the stylus position detection module 511 and the stylus suspension module 407' before rigidly coupling to the stylus position detection module 511 as part of assembling the scanning probe 400. The signal processing and control circuitry module 480 is configured to be operably connected to the coils (e.g., of the field generating coil configuration 560, axial sensing coil configurations TASCC and BASCC, and rotary sensing coils TRSC and BRSC) of the stylus position detection module 511 to provide the coil drive signal and to input signals comprising respective signal components provided by the respective rotary and axial sensing coils, and to output signals indicative of an axial position and a rotary position of one or more of the disruptor element 551, the stylus coupling portion 442, or the probe tip 448 (e.g., in various implementations, the signals that are output may be indicative of an axial position and a rotary position of each of the disruptor element 551, the stylus coupling portion 442, and the probe tip 448).

The modular configuration MCF may further comprise a probe cover 403.

The probe cover 403 may be configured to surround the stylus position detection module 511 when the scanning probe 400 is assembled.

In one aspect, the probe cover 403 is not configured to be directly rigidly attached to the stylus position detection module 511 when the scanning probe 400 is assembled.

The modular configuration MCF may further comprise at least a minimum spacing SPS between the probe cover 403 and the stylus position detection module 511 which mechanically isolates the probe cover 403 from the stylus position detection module 511 when the scanning probe 400 is assembled. The spacing SPS is configured to reduce any damage that may otherwise occur to the stylus position detection module 511 due to an impact to an outer surface of the probe cover 403.

The probe cover 403 may be configured to surround the signal processing and control circuitry module 480 when the scanning probe 400 is assembled.

In one aspect, the probe cover 403 is not configured to be directly rigidly attached to the signal processing and control circuitry module 480 when the scanning probe 400 is assembled.

In one aspect, the assembled scanning probe 400 is configured to have at least a minimum spacing SPA between the probe cover 403 and the signal processing and control circuitry module 480 which mechanically isolates the probe cover 403 from the signal processing and control circuitry module 480 when the scanning probe 400 is assembled. The spacing SPA is configured to reduce any damage that may otherwise occur to the signal processing and control circuitry module 480 due to an impact to an outer surface of the probe cover 403.

In one aspect, the probe cover 403 may be configured to be rigidly attached to the stylus suspension module 407'.

In one aspect, the probe cover 403 is configured to surround the signal processing and control circuitry module 480 and the stylus position detection module 511 but is not configured to be directly rigidly attached to the signal processing and control circuitry module 480 or the stylus position detection module 511 when the scanning probe 400 is assembled.

In one aspect, the stylus position detection module 511 further comprises a first mounting portion FMP and the stylus suspension module 407' further comprises a second mounting portion SMP. The first and second mounting portions form a module mounting configuration MMC in which the second mounting portion SMP is configured to be engaged by the first mounting portion FMP for mounting the stylus position detection module 511 to the stylus suspension module 407'.

In one aspect, during the assembly of the scanning probe 400, the module mounting configuration MMC is configured to enable the relative position of at least part of the stylus position detection module 511 to be adjusted in the X and Y directions relative to the stylus suspension module 407' for aligning the stylus position detection module 511 with the stylus suspension module 407'.

In one aspect, the modular configuration MCF further comprises a module securing configuration MSC which is configured to rigidly secure the first mounting portion FMP to the second mounting portion SMP for rigidly securing the stylus position detection module 511 to the stylus suspension module 407' after the stylus position detection module 511 has been aligned with the stylus suspension module 407'.

In one aspect, the signal processing and control circuitry module 480 further comprises a first coupling portion FCP and the stylus position detection module 511 further comprises a second coupling portion SCP. The first and second coupling portions form a module coupling configuration MCC in which the second coupling portion SCP is configured to be coupled to the first coupling portion FCP for coupling the signal processing and control circuitry module 480 to the stylus position detection module 511.

According to another aspect, a method is provided for assembling a modular configuration MCF of a scanning probe 400 for a coordinate measuring machine 200. The method includes generally two steps.

The first step includes mounting a stylus position detection module 511 to a stylus suspension module 407' (e.g., in accordance with configurations as disclosed herein).

The second step includes rigidly coupling a signal processing and control circuitry module 480 to the stylus position detection module 511 (e.g., in accordance with configurations as disclosed herein).

In one aspect, the method further comprises rigidly coupling a probe cover 403 to the stylus suspension module 407', wherein the probe cover 403 is configured to surround the signal processing and control circuitry module 480 and the stylus position detection module 511 but is not configured to be directly rigidly attached to the signal processing and control circuitry module 480 or the stylus position detection module 511 when the scanning probe 400 is assembled.

In one aspect, the mounting of the stylus position detection module 511 to the stylus suspension module 407' comprises:

utilizing a module mounting configuration MMC to mount the stylus position detection module 511 to the stylus suspension module 407', wherein the module mounting configuration MMC enables the position of at least part of the stylus position detection module 511 to be adjusted in X and Y directions relative to the stylus position detection module 511;

adjusting the position of at least part of the stylus position detection module 511 in X and Y directions to align the stylus position detection module 511 with the stylus suspension module 407'; and utilizing a module securing configuration MSC to rigidly secure the stylus position detection module 511 to the stylus suspension module 407' after the adjustment in the X and Y directions is completed.

According to one aspect, a system (e.g., including a scanning probe 400 as disclosed herein) further comprises: a drive mechanism 220 configured to be attached to the scanning probe 400 and comprising movement mechanisms for moving the scanning probe 400 three-dimensionally for measuring a surface of a workpiece W; and a drive mechanism attachment portion 224 configured to attach the scanning probe 400 to the drive mechanism 220.

According to a further aspect, a scanning probe 400 for a coordinate measuring machine 200 is provided (e.g., in accordance with configurations as disclosed herein). The scanning probe 400 comprises a shield configuration SHC that is located around the sensor configuration SNC and comprises electrically conductive material for shielding the sensor configuration SNC.

In one aspect, the shield configuration SHC is configured to form an electromagnetic boundary of the sensor configuration SNC.

In one aspect, the shield configuration SHC is configured to reduce crosstalk or other interference that would otherwise be caused by at least one of the components or operations of at least one of the signal processing and control circuitry module 480 or the stylus suspension module 407' and that would otherwise affect the signals of the sensing coils of the sensor configuration SNC if the shield configuration SHC was not present around the sensor configuration SNC.

In one aspect, the shield configuration SHC comprises one or more slots SL, wherein each slot SL has dimensions which enable an electrical connector from the signal processing and control circuitry module 480 to pass through the slot SL in the shield configuration SHC to be received by the sensor configuration SNC. Each slot SL is oriented along a direction perpendicular to the axial direction O, such that a dimension of the slot SL along the axial direction O is smaller than a dimension of the slot SL along the direction perpendicular to the axial direction O.

In one aspect, the scanning probe 400 further comprises a probe cover 403 which surrounds the shield configuration SHC of the stylus position detection module 511. The probe cover 403 is mechanically isolated from the stylus position detection module 511 with at least a minimum spacing SPS between an inner surface of the probe cover 403 and an outer surface of the shield configuration SHC.

In one aspect, the stylus position detection module 511 further comprises a first mounting portion FMP and the stylus suspension module 407' further comprises a second mounting portion SMP. The first and second mounting portions form a module mounting configuration MMC in which the second mounting portion SMP is configured to be engaged by the first mounting portion FMP for mounting the stylus position detection module 511 to the stylus suspension module 407'.

In one aspect, the second mounting portion SMP comprises a plurality of upper extension portions UEP and the first mounting portion FMP comprises a plurality of lower extension portions LEP that are configured to be located at least partially beneath the plurality of upper extension portions UEP when the second mounting portion SMP is engaged by the first mounting portion FMP.

In one aspect, the module mounting configuration MMC is configured to enable the plurality of lower extension portions LEP to be slidable beneath the plurality of upper extension portions UEP in X and Y directions when the second mounting portion SMP is engaged by the first mounting portion FMP.

In one aspect, the module mounting configuration MMC is configured to enable the relative position of at least part of the stylus position detection module 511 to be adjusted in the X and Y directions relative to the stylus suspension module 407' for aligning the stylus position detection module 511 with the stylus suspension module 407'.

In one aspect, the scanning probe 400 further comprises a module securing configuration MSC which is configured to rigidly secure the first mounting portion FMP to the second mounting portion SMP for rigidly securing the stylus position detection module 511 to the stylus suspension module 407' after the stylus position detection module 511 has been aligned with the stylus suspension module 407'.

In one aspect, the module securing configuration MSC comprises one or more mechanical fastening configurations MFC that are utilized to rigidly secure the first mounting portion FMP to the second mounting portion SMP and for which an adhesive is not utilized for rigidly securing the stylus position detection module 511 to the stylus suspension module 407'.

In one aspect, a disruptor assembly 554 of the scanning probe 400 comprises the disruptor element 551 and the disruptor assembly 554 is rigidly attached to an upper portion 412C of the moving member 412 of the stylus suspension module 407' by the disruptor coupling configuration 553. The disruptor assembly 554 further comprises an adjustment component 597 which is configured to enable a location of the disruptor element 551 relative to the moving member 412 of the stylus suspension module 407' to be adjusted along the axial direction O to achieve a desired alignment in the axial direction O within the stylus position detection module 511 after the stylus position detection module 511 is mounted to the stylus suspension module 407'. After the desired alignment is achieved the location of the disruptor element 551 is rigidly fixed relative to the moving member 412 of the stylus suspension module 407'.

In one aspect, the sensor configuration SNC comprises top and bottom coil substrates 571T and 571B on which at least some of the top and bottom coils are located, respectively. The top coil substrate 571T comprises a top hole 591T which enables at least one of the disruptor element 551 or the adjustment component 597 to be accessed for adjusting the location of the disruptor element 551 before the signal processing and control circuitry module 480 is rigidly coupled to the stylus position detection module 511 as part of assembling the scanning probe 400.

According to a further aspect, a method is provided that includes generally two steps.

The first step includes moving a scanning probe 400 so as to correspondingly move a probe tip 448 along a surface of a workpiece W.

The second step includes generating three-dimensional position information based on signals generated by sensing coils of the scanning probe 400 as the probe tip 448 is moved along the surface of the workpiece W.

In one aspect, the shield configuration SHC forms an electromagnetic boundary for the changing magnetic flux generated by the field generating coil configuration 560.

In one aspect, the shield configuration SHC reduces crosstalk or other interference that would otherwise be caused by at least one of the components or operations of at least one of the signal processing and control circuitry module 480 or the stylus suspension module 407' and that would otherwise affect the signals of the sensing coils of the sensor configuration SNC if the shield configuration SHC was not present around the sensor configuration SNC.

In one aspect, as part of an assembling of scanning probe 400 before the probe tip 448 is moved along the surface of the workpiece W, a module mounting configuration MMC is utilized for mounting the stylus position detection module 511 to the stylus suspension module 407' and for which at least part of the stylus position detection module 511 is adjusted in X and Y directions relative to the stylus suspension module 407' as enabled by the module mounting configuration MMC so as to align the stylus position detection module 511 with the stylus suspension module 407'.

According to a still further aspect, a system is provided that comprises: a scanning probe 400; a drive mechanism 220; and a drive mechanism attachment portion 224 attaching the scanning probe 400 to the drive mechanism 220.

According to one aspect, the drive mechanism 220 is utilized to move the scanning probe 400 so as to correspondingly move the probe tip 448 along a surface of a workpiece W, and for which the signal processing and control circuitry correspondingly outputs signals indicative of an axial position and a rotary position of the probe tip 448 as the probe tip 448 is moved along the surface of the workpiece W.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

What is claimed is:

1. A modular configuration for a scanning probe for a coordinate measuring machine, the modular configuration for the scanning probe comprising:
 a stylus suspension module, comprising:
  a stylus coupling portion that is configured to be rigidly coupled to a stylus with a probe tip; and
  a stylus motion mechanism that enables axial motion of the stylus coupling portion along an axial direction, and rotary motion of the stylus coupling portion about a rotation center;
 a stylus position detection module configured to be assembled separately from the stylus suspension module before mounting to the stylus suspension module as part of assembling the scanning probe, wherein when mounted the stylus position detection module is configured to be arranged along a central axis that is parallel to the axial direction and nominally aligned with the rotation center, the stylus position detection module comprising:

a sensor configuration comprising:
  a field generating coil configuration comprising at least one field generating coil;
  a top axial sensing coil configuration comprising at least one top axial sensing coil;
  a bottom axial sensing coil configuration comprising at least one bottom axial sensing coil; and
  a plurality of top rotary sensing coils and a plurality of bottom rotary sensing coils;
wherein a disruptor configuration of the scanning probe is configured to be coupled to the stylus suspension module, the disruptor configuration comprising a conductive disruptor element that provides a disruptor area, wherein the disruptor element is configured to be located along the central axis in a disruptor motion volume and to be coupled to the stylus suspension module by a disruptor coupling configuration, and to move in the disruptor motion volume relative to an undeflected position in response to a deflection of the stylus suspension module, for which the disruptor element moves over operating motion ranges+/−Rz along the axial direction in response to the axial motion, and over respective operating motion ranges+/−Rx and +/−Ry along orthogonal X and Y directions that are orthogonal to the axial direction in response to the rotary motion, and the field generating coil configuration is configured to generate a changing magnetic flux generally along the axial direction in the disruptor motion volume in response to a coil drive signal; and a signal processing and control circuitry module that is configured to be assembled separately from the stylus position detection module and the stylus suspension module before rigidly coupling to the stylus position detection module as part of assembling the scanning probe, wherein the signal processing and control circuitry module is configured to be operably connected to the coils of the stylus position detection module to provide the coil drive signal and to input signals comprising respective signal components provided by the respective rotary and axial sensing coils, and to output signals indicative of an axial position and a rotary position of one or more of the disruptor element, the stylus coupling portion, or the probe tip.

2. The modular configuration of claim 1, further comprising a probe cover.

3. The modular configuration of claim 2, wherein the probe cover is configured to surround the stylus position detection module when the scanning probe is assembled.

4. The modular configuration of claim 3, wherein the probe cover is not configured to be directly rigidly attached to the stylus position detection module when the scanning probe is assembled.

5. The modular configuration of claim 3, further comprising at least a minimum spacing between the probe cover and the stylus position detection module which mechanically isolates the probe cover from the stylus position detection module when the scanning probe is assembled, and for which the spacing is configured to reduce any damage that may otherwise occur to the stylus position detection module due to an impact to an outer surface of the probe cover.

6. The modular configuration of claim 2, wherein the probe cover is configured to surround the signal processing and control circuitry module when the scanning probe is assembled.

7. The modular configuration of claim 6, wherein the probe cover is not configured to be directly rigidly attached to the signal processing and control circuitry module when the scanning probe is assembled.

8. The modular configuration of claim 6, wherein the assembled scanning probe is configured to have at least a minimum spacing between the probe cover and the signal processing and control circuitry module which mechanically isolates the probe cover from the signal processing and control circuitry module when the scanning probe is assembled, and for which the spacing is configured to reduce any damage that may otherwise occur to the signal processing and control circuitry module due to an impact to an outer surface of the probe cover.

9. The modular configuration of claim 2, wherein the probe cover is configured to be rigidly attached to the stylus suspension module.

10. The modular configuration of claim 9, wherein the probe cover is configured to surround the signal processing and control circuitry module and the stylus position detection module but is not configured to be directly rigidly attached to the signal processing and control circuitry module or the stylus position detection module when the scanning probe is assembled.

11. The modular configuration of claim 1, wherein the stylus position detection module further comprises a first mounting portion and the stylus suspension module further comprises a second mounting portion, the first and second mounting portions forming a module mounting configuration in which the second mounting portion is configured to be engaged by the first mounting portion for mounting the stylus position detection module to the stylus suspension module.

12. The modular configuration of claim 11, wherein during the assembly of the scanning probe, the module mounting configuration is configured to enable the relative position of at least part of the stylus position detection module to be adjusted in the X and Y directions relative to the stylus suspension module for aligning the stylus position detection module with the stylus suspension module.

13. The modular configuration of claim 12, further comprising a module securing configuration which is configured to rigidly secure the first mounting portion to the second mounting portion for rigidly securing the stylus position detection module to the stylus suspension module after the stylus position detection module has been aligned with the stylus suspension module.

14. The modular configuration of claim 1, wherein the signal processing and control circuitry module further comprises a first coupling portion and the stylus position detection module further comprises a second coupling portion, the first and second coupling portions forming a module coupling configuration in which the second coupling portion is configured to be coupled to the first coupling portion for coupling the signal processing and control circuitry module to the stylus position detection module.

15. A method of assembling a modular configuration of a scanning probe for a coordinate measuring machine, the method comprising:

mounting a stylus position detection module to a stylus suspension module, wherein:

the stylus suspension module comprises:
a stylus coupling portion that is configured to be rigidly coupled to a stylus with a probe tip; and
a stylus motion mechanism that enables axial motion of the stylus coupling portion along an axial direction, and rotary motion of the stylus coupling portion about a rotation center; and the stylus position detection module is configured to be assembled separately from the stylus suspension module before mounting to the stylus suspension module, and when mounted the stylus position detection module is arranged along a central axis that is parallel to the axial direction and nominally aligned with the rotation center, and the stylus position detection module comprises:

a sensor configuration comprising:
a field generating coil configuration comprising at least one field generating coil;
a top axial sensing coil configuration comprising at least one top axial sensing coil;
a bottom axial sensing coil configuration comprising at least one bottom axial sensing coil; and
a plurality of top rotary sensing coils and a plurality of bottom rotary sensing coils;

a disruptor configuration of the scanning probe is coupled to the stylus suspension module, the disruptor configuration comprising a conductive disruptor element that provides a disruptor area, wherein the disruptor element is configured to be located along the central axis in a disruptor motion volume and to be coupled to the stylus suspension module by a disruptor coupling configuration, and to move in the disruptor motion volume relative to an undeflected position in response to a deflection of the stylus suspension module, for which the disruptor element moves over operating motion ranges+/−Rz along the axial direction in response to the axial motion, and over respective operating motion ranges+/−Rx and +/−Ry along orthogonal X and Y directions that are orthogonal to the axial direction in response to the rotary motion, and the field generating coil configuration is configured to generate a changing magnetic flux generally along the axial direction in the disruptor motion volume in response to a coil drive signal; and rigidly coupling a signal processing and control circuitry module to the stylus position detection module, wherein the signal processing and control circuitry module is configured to be assembled separately from the stylus position detection module and the stylus suspension module before rigidly coupling to the stylus position detection module, wherein the signal processing and control circuitry module is operably connected to the coils of the stylus position detection module to provide the coil drive signal and to input signals comprising respective signal components provided by the respective rotary and axial sensing coils, and to output signals indicative of an axial position and a rotary position of one or more of the disruptor element, the stylus coupling portion, or the probe tip.

16. The method of claim 15, further comprising rigidly coupling a probe cover to the stylus suspension module, wherein the probe cover is configured to surround the signal processing and control circuitry module and the stylus position detection module but is not configured to be directly rigidly attached to the signal processing and control circuitry module or the stylus position detection module when the scanning probe is assembled.

17. The method of claim 16, wherein the mounting of the stylus position detection module to the stylus suspension module comprises:

utilizing a module mounting configuration to mount the stylus position detection module to the stylus suspension module, wherein the module mounting configuration enables the position of at least part of the stylus position detection module to be adjusted in X and Y directions relative to the stylus position detection module;

adjusting the position of at least part of the stylus position detection module in X and Y directions to align the stylus position detection module with the stylus suspension module; and utilizing a module securing configuration to rigidly secure the stylus position detection module to the stylus suspension module after the adjustment in the X and Y directions is completed.

18. A system, comprising:
a scanning probe, comprising:
a stylus suspension module, comprising:
a stylus coupling portion that is configured to be rigidly coupled to a stylus with a probe tip; and
a stylus motion mechanism that enables axial motion of the stylus coupling portion along an axial direction, and rotary motion of the stylus coupling portion about a rotation center;

a stylus position detection module configured to be assembled separately from the stylus suspension module before mounting to the stylus suspension module as part of assembling the scanning probe, wherein when mounted the stylus position detection module is arranged along a central axis that is parallel to the axial direction and nominally aligned with the rotation center, the stylus position detection module comprising:

a sensor configuration comprising:
a field generating coil configuration comprising at least one field generating coil;
a top axial sensing coil configuration comprising at least one top axial sensing coil;
a bottom axial sensing coil configuration comprising at least one bottom axial sensing coil; and
a plurality of top rotary sensing coils and a plurality of bottom rotary sensing coils;

a disruptor configuration coupled to the stylus suspension module, the disruptor configuration comprising a conductive disruptor element that provides a disruptor area, wherein the disruptor element is configured to be located along the central axis in a disruptor motion volume and to be coupled to the stylus suspension module by a disruptor coupling configuration, and to move in the disruptor motion volume relative to an undeflected position in response to a deflection of the stylus suspension module, for which the disruptor element moves over operating motion ranges+/−Rz along the axial direction in response to the axial motion, and over respective operating motion ranges+/−Rx and +/−Ry along orthogonal X and Y directions that are orthogonal to the axial direction in response to the rotary motion, and the field generating coil configuration is configured to generate a changing magnetic flux generally along the axial direction in the disruptor motion volume in response to a coil drive signal; and a signal processing and control circuitry module that is configured to be assembled separately from the stylus position detection module and the stylus suspension module before rigidly coupling to the stylus position detection module as part of assembling the scanning probe, wherein the signal processing and control circuitry module is operably connected to the coils of the stylus position detection module to provide the coil drive signal and to input signals comprising respective signal components provided by the respective rotary and axial sensing coils, and to output signals indicative of an axial position and a rotary position of one or more of the disruptor element, the stylus coupling portion, or the probe tip.

19. The system of claim 18, wherein the scanning probe further comprises:

a probe cover configured to surround the signal processing and control circuitry module and the stylus position detection module but not be directly rigidly attached to the signal processing and control circuitry module or the stylus position detection module when the scanning probe is assembled.

20. The system of claim 18, further comprising:

a drive mechanism configured to be attached to the scanning probe and comprising movement mechanisms for moving the scanning probe three-dimensionally for measuring a surface of a workpiece; and a drive mechanism attachment portion configured to attach the scanning probe to the drive mechanism.

* * * * *